US012606948B2

(12) United States Patent
Jeon et al.

(10) Patent No.: US 12,606,948 B2
(45) Date of Patent: Apr. 21, 2026

(54) LAUNDRY TREATING APPARATUS

(71) Applicant: LG ELECTRONICS INC., Seoul (KR)

(72) Inventors: Gyeoungjin Jeon, Seoul (KR); Taesang Park, Seoul (KR); Joonho Pyo, Seoul (KR); Boram Lee, Seoul (KR); Jeongyeon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 18/274,941

(22) PCT Filed: Feb. 3, 2022

(86) PCT No.: PCT/KR2022/001696

§ 371 (c)(1),
(2) Date: Jul. 28, 2023

(87) PCT Pub. No.: WO2022/164296

PCT Pub. Date: Aug. 4, 2022

(65) Prior Publication Data

US 2024/0084496 A1 Mar. 14, 2024

(51) Int. Cl.
 D06F 37/40 (2006.01)
 D06F 23/04 (2006.01)
 D06F 37/12 (2006.01)
 H02K 7/108 (2006.01)
 H02K 7/116 (2006.01)

(52) U.S. Cl.
 CPC .............. D06F 37/40 (2013.01); D06F 23/04 (2013.01); D06F 37/12 (2013.01); H02K 7/108 (2013.01); H02K 7/116 (2013.01)

(58) Field of Classification Search
 CPC .......... D06F 37/40; D06F 23/04; D06F 37/12; H02K 7/108; H02K 7/116
 USPC ........................................... 68/12.24
 See application file for complete search history.

(56) References Cited

U.S. PATENT DOCUMENTS

| | | | |
|---|---|---|---|
| 4,291,556 A | 9/1981 | Mason | |
| 2020/0131686 A1 | 4/2020 | Lee et al. | |

FOREIGN PATENT DOCUMENTS

| JP | 8-66581 A | 3/1996 |
|---|---|---|
| JP | 10-113494 A | 5/1998 |
| JP | 5940423 B2 | 6/2016 |
| KR | 10-0268263 B1 | 10/2000 |
| KR | 10-0274986 B1 | 12/2000 |
| KR | 10-2002-0058548 A | 7/2002 |
| KR | 10-2002-0093530 A | 12/2002 |
| KR | 10-2008-0092023 A | 10/2008 |
| KR | 10-2010-0083507 A | 7/2010 |
| KR | 10-1892012 B1 | 8/2018 |
| KR | 10-2019-0089616 A | 7/2019 |
| KR | 10-2020-0069641 A | 6/2020 |

OTHER PUBLICATIONS

KR20190089616A—machine translation (Year: 2019).*
JPH0866581A—machine translation (Year: 1996).*

* cited by examiner

*Primary Examiner* — Tinsae B Ayalew
(74) *Attorney, Agent, or Firm* — Birch, Stewart, Kolasch & Birch, LLP

(57) ABSTRACT

A laundry treating apparatus includes a coupler that connects a housing (a gearbox) capable of rotating a driver and a drum in a clutch inside the housing.

25 Claims, 16 Drawing Sheets

【FIG 1】
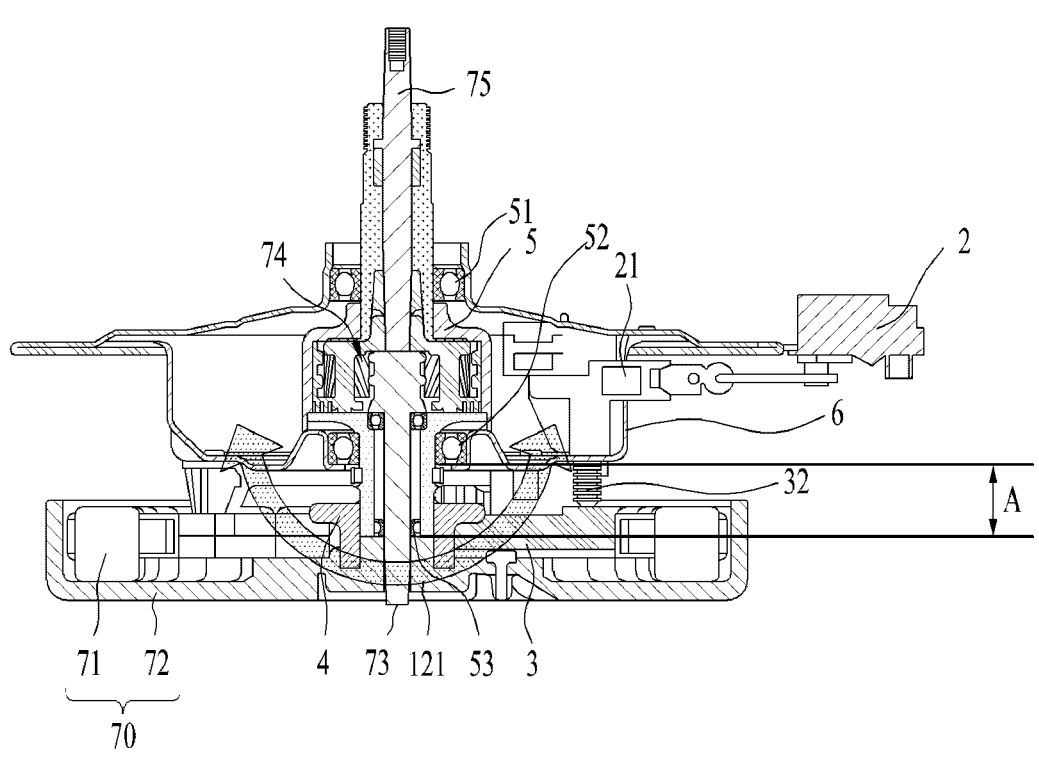

【FIG 2】
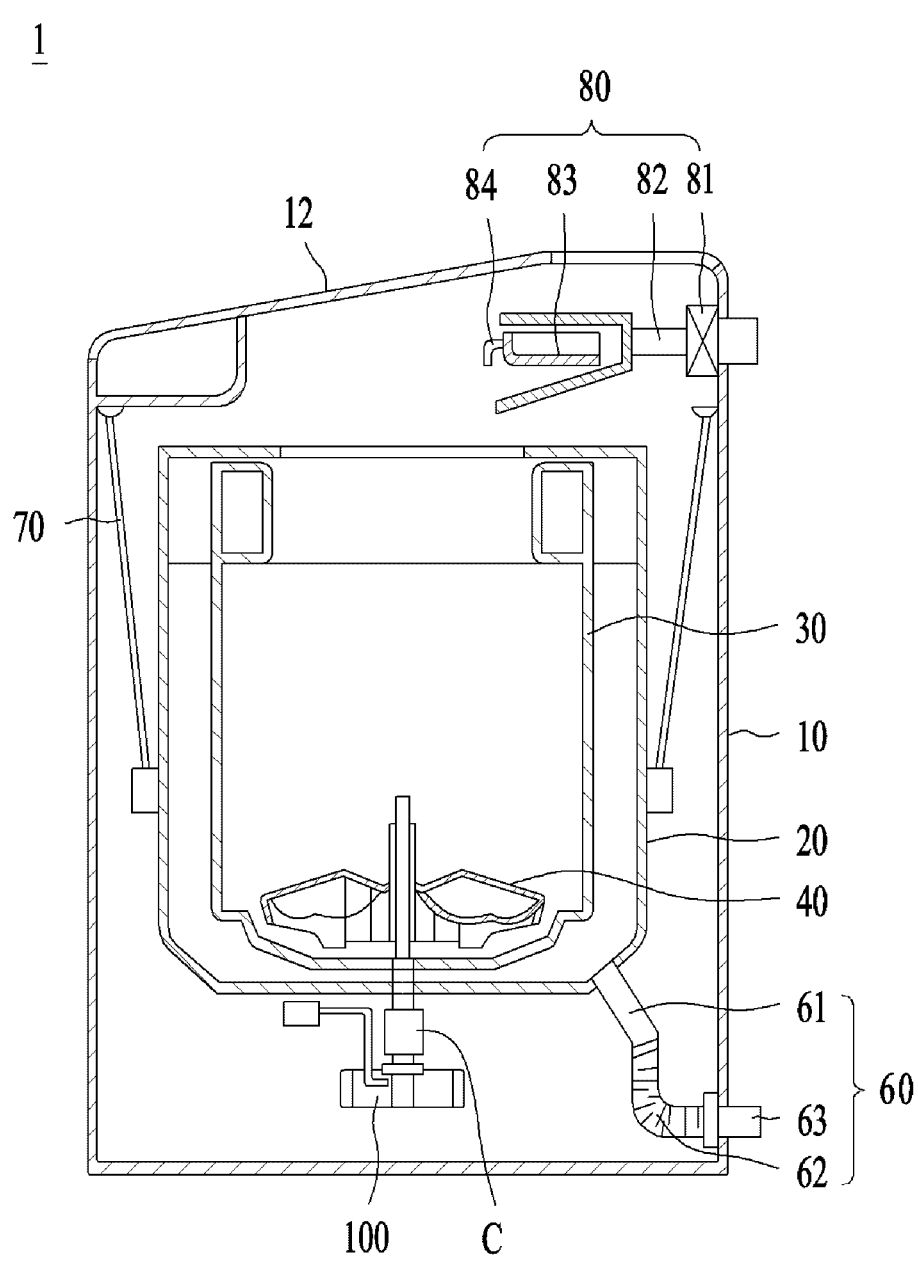

【FIG 3】
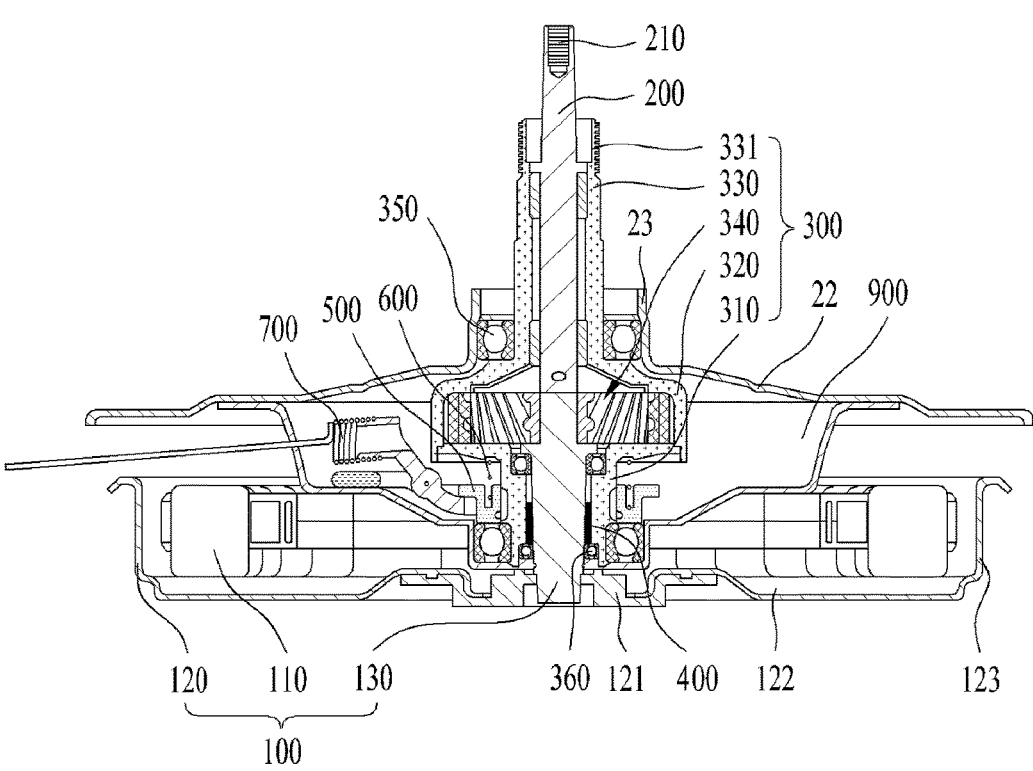
【FIG 4】
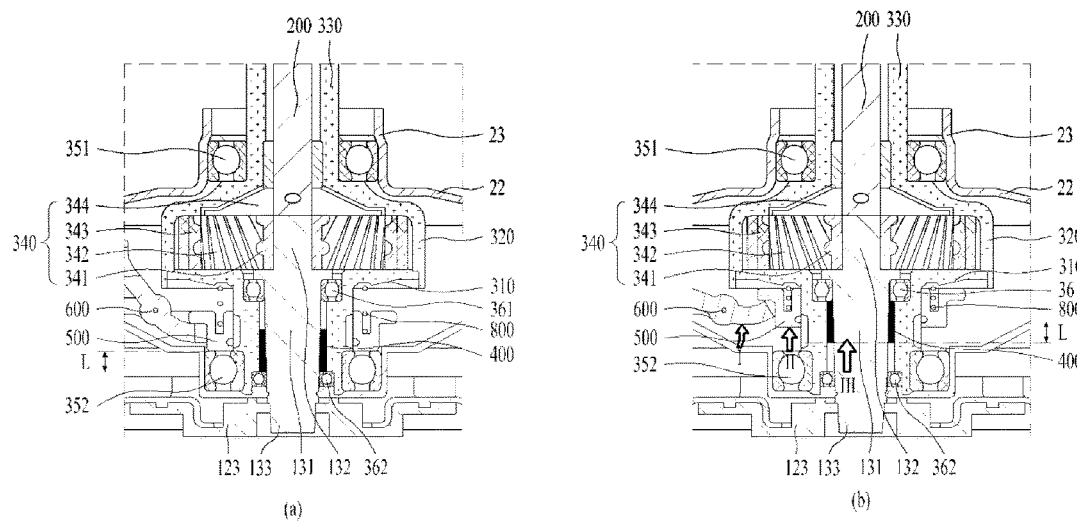
(a)              (b)

[Fig. 5]
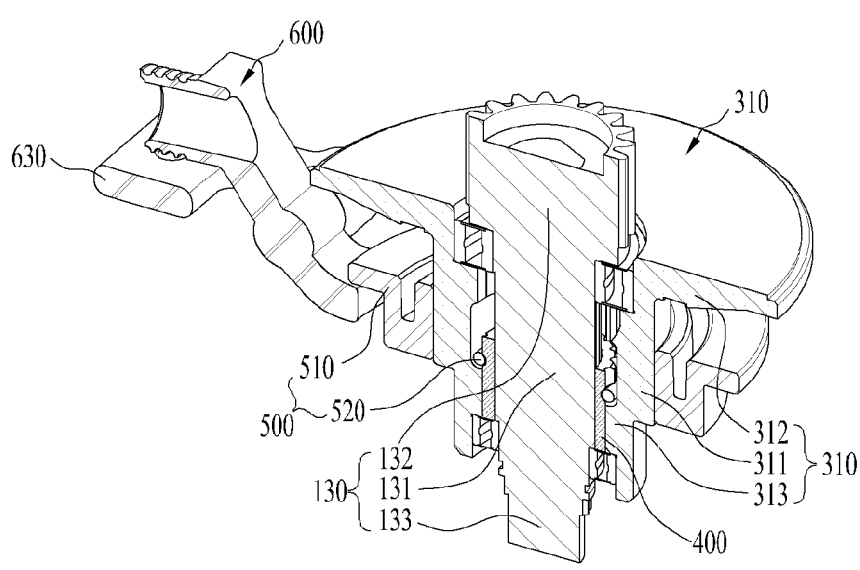

【FIG 6】
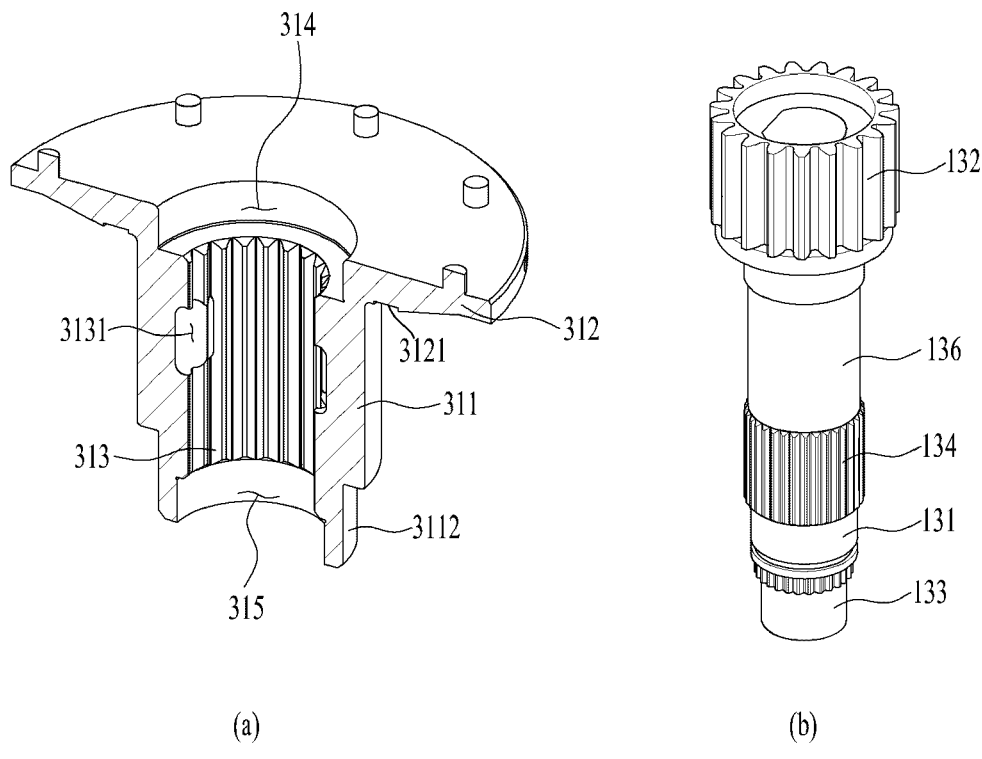
(a)                                      (b)
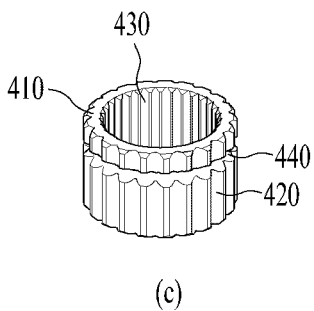
(c)

[Fig. 7]
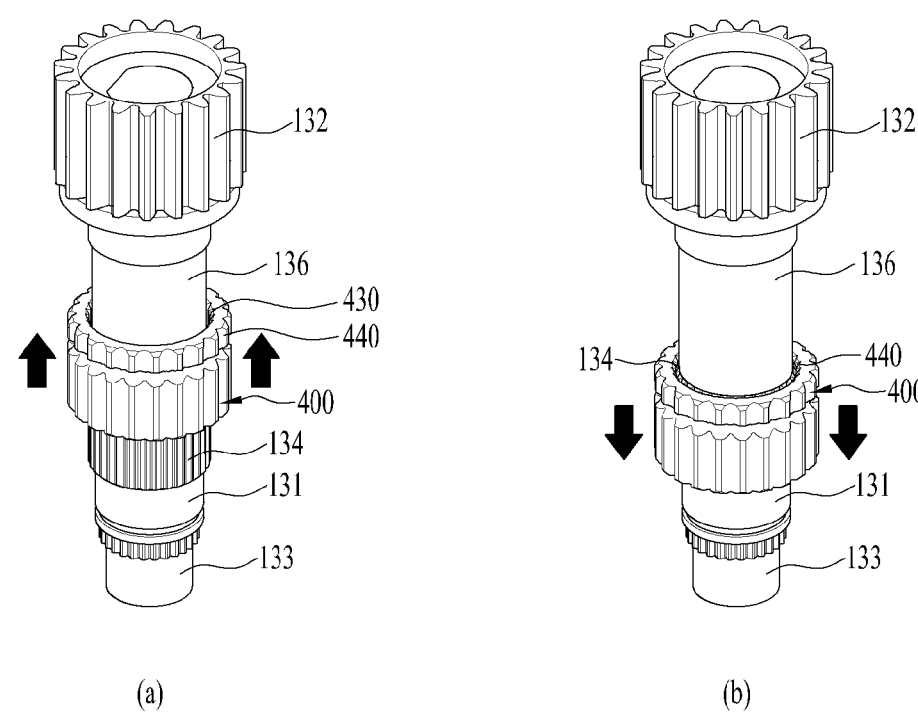
(a)                                (b)
[Fig. 8]
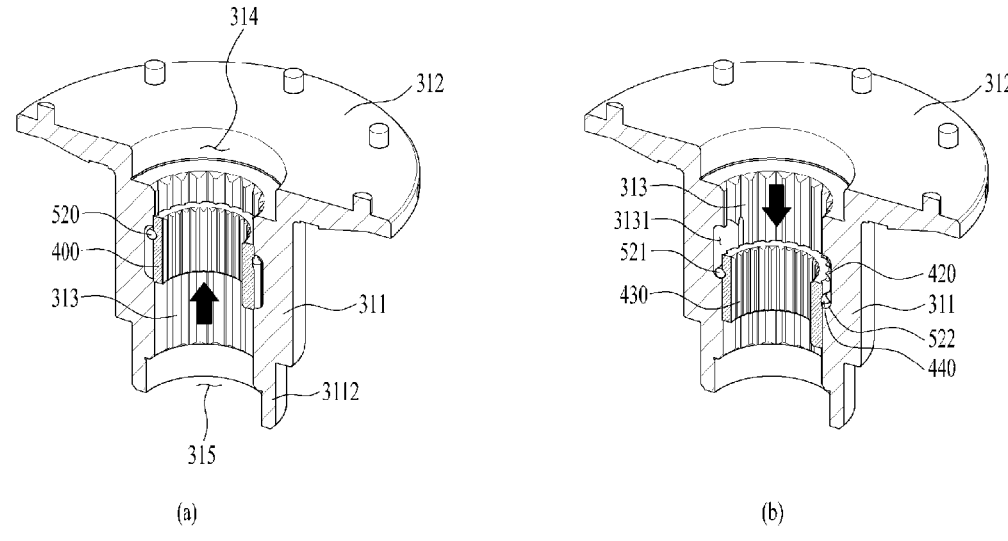
(a)                                (b)

[Fig. 9]
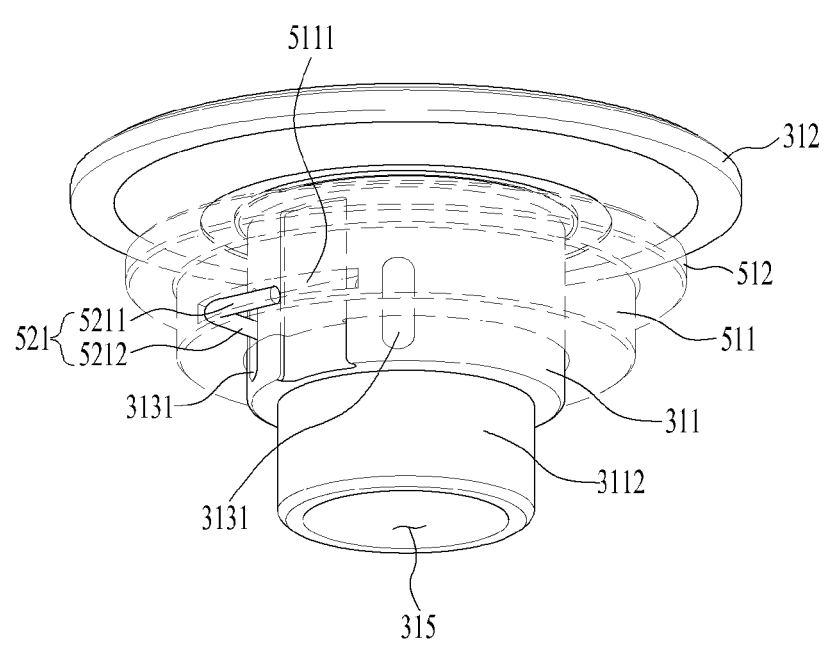

[Fig. 10]
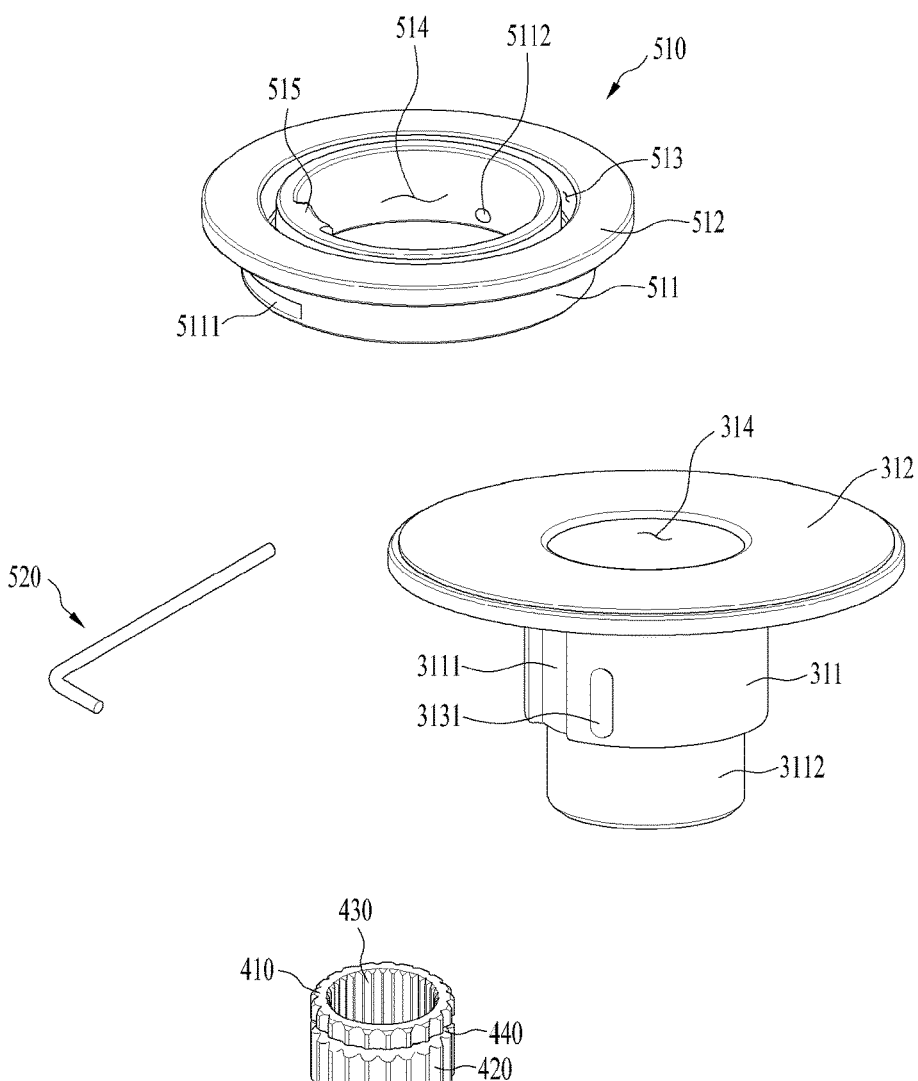
[Fig. 11]
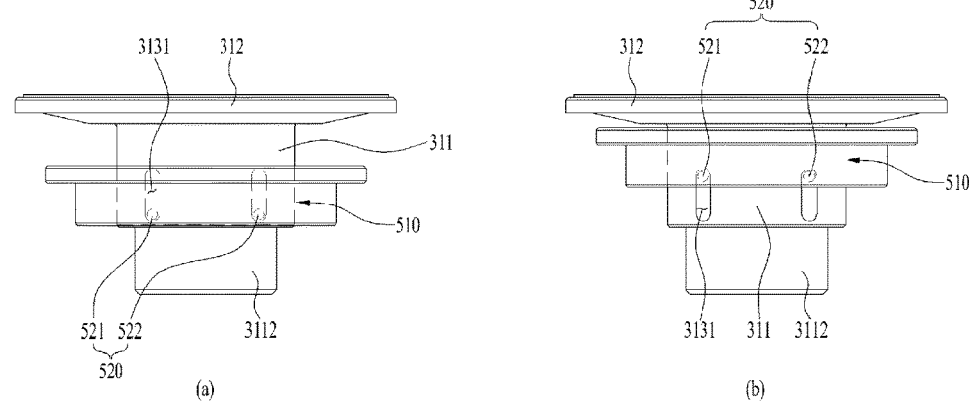
(a)                                              (b)

[Fig. 12]
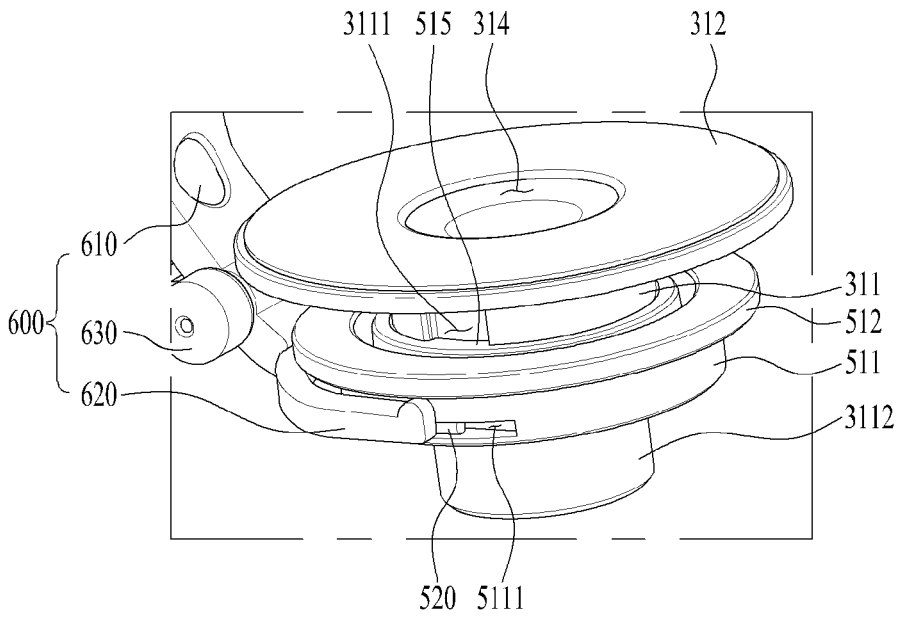
[Fig. 13]
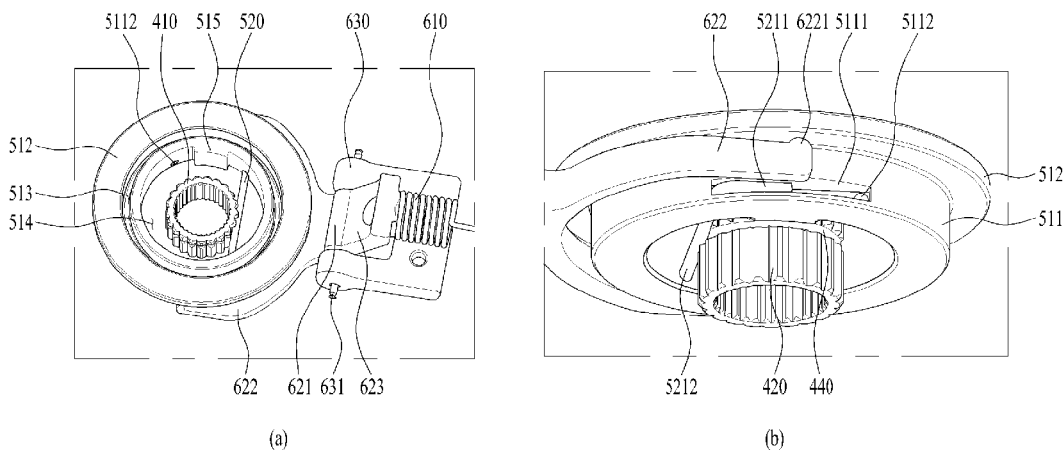
(a)            (b)

[Fig. 14]
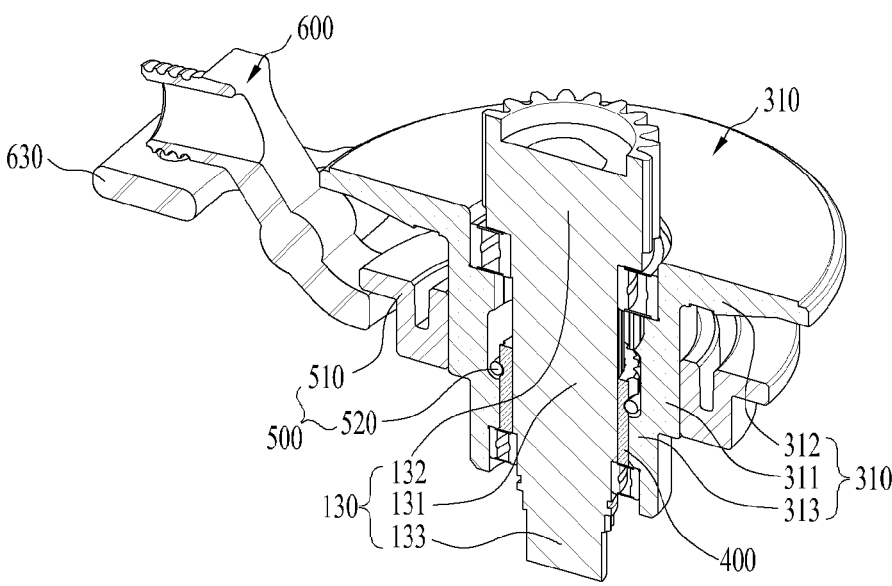
[Fig. 15]
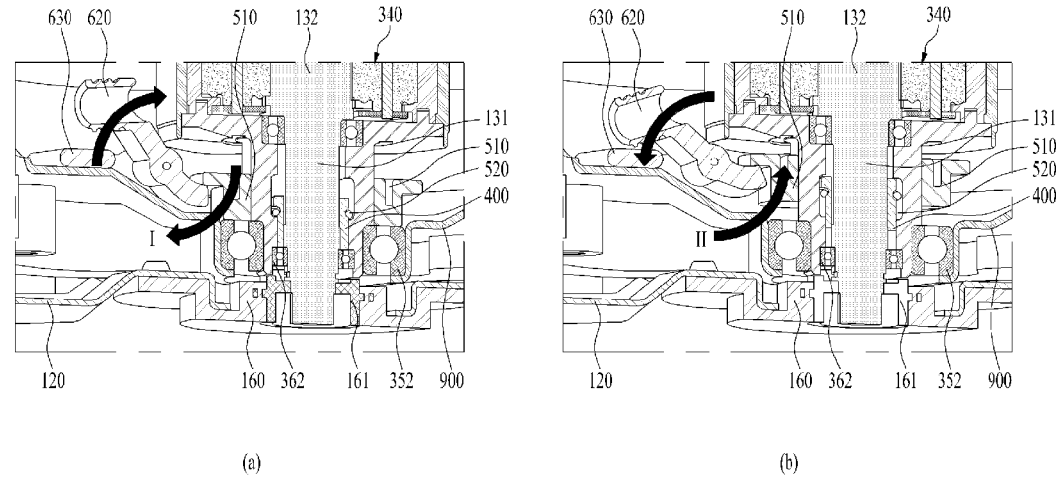
(a)                          (b)
[Fig. 16]
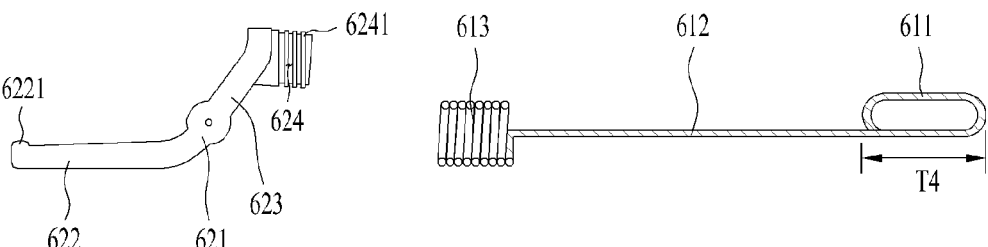

[Fig. 17]
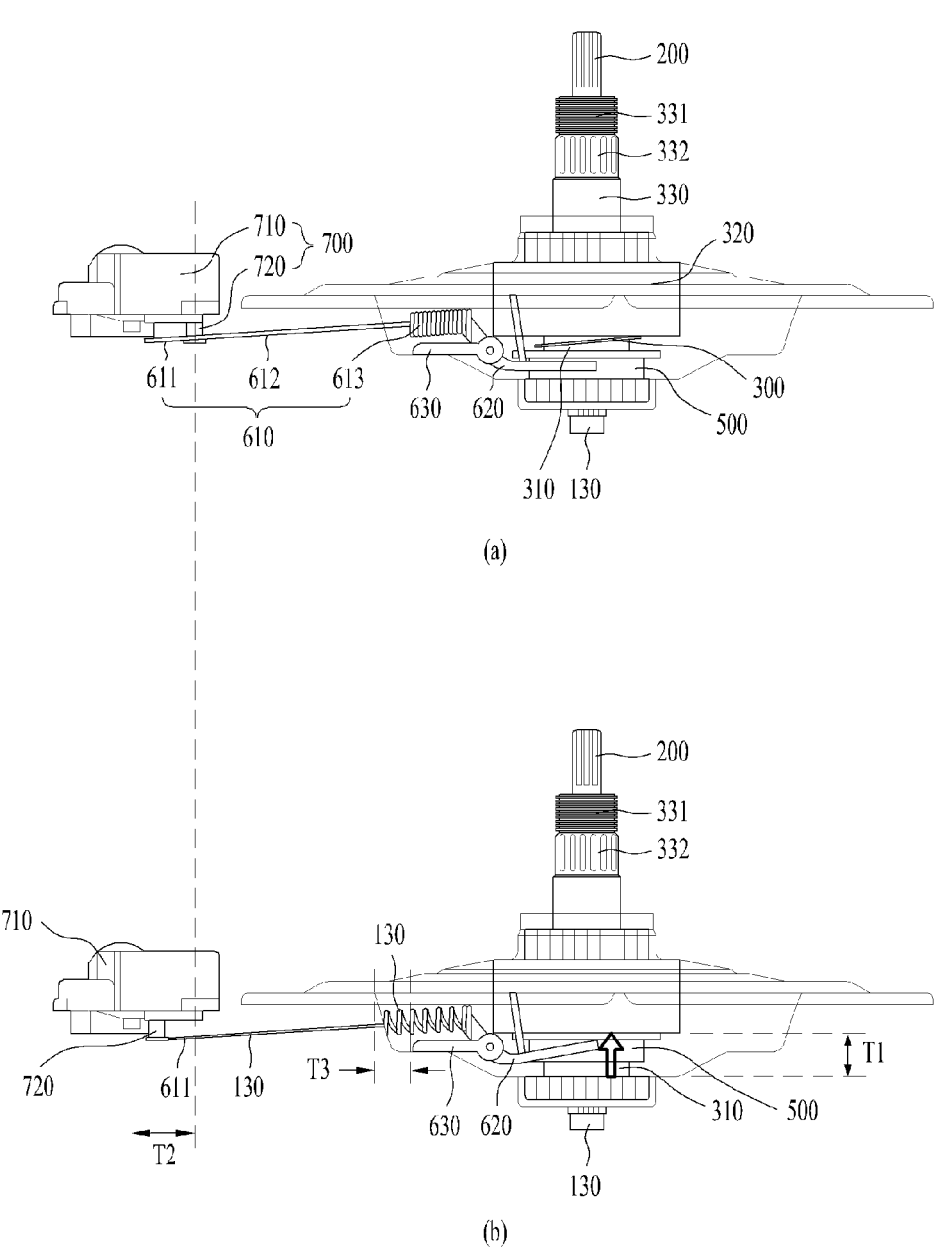
(a)
(b)

[Fig. 18]
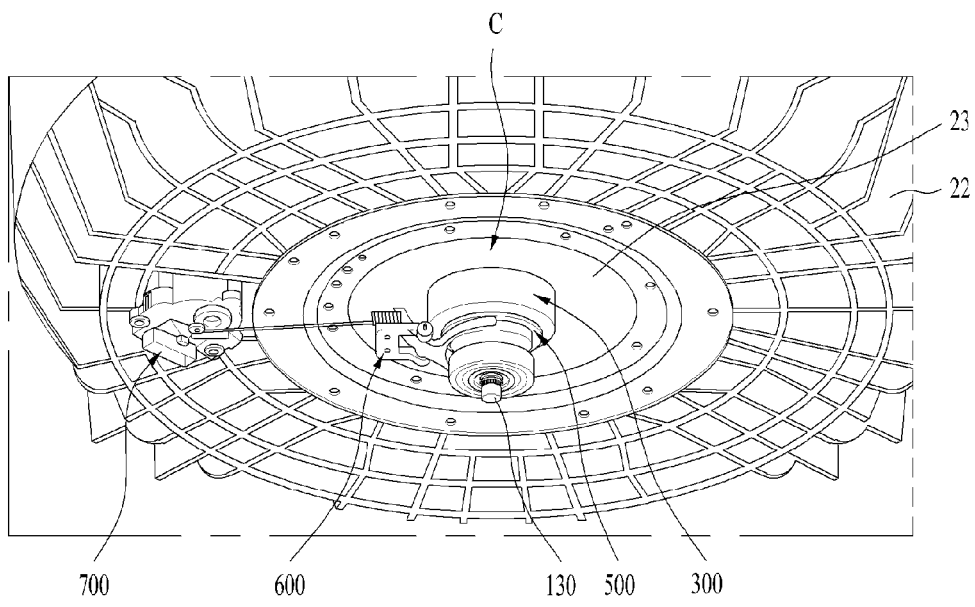
[Fig. 19]
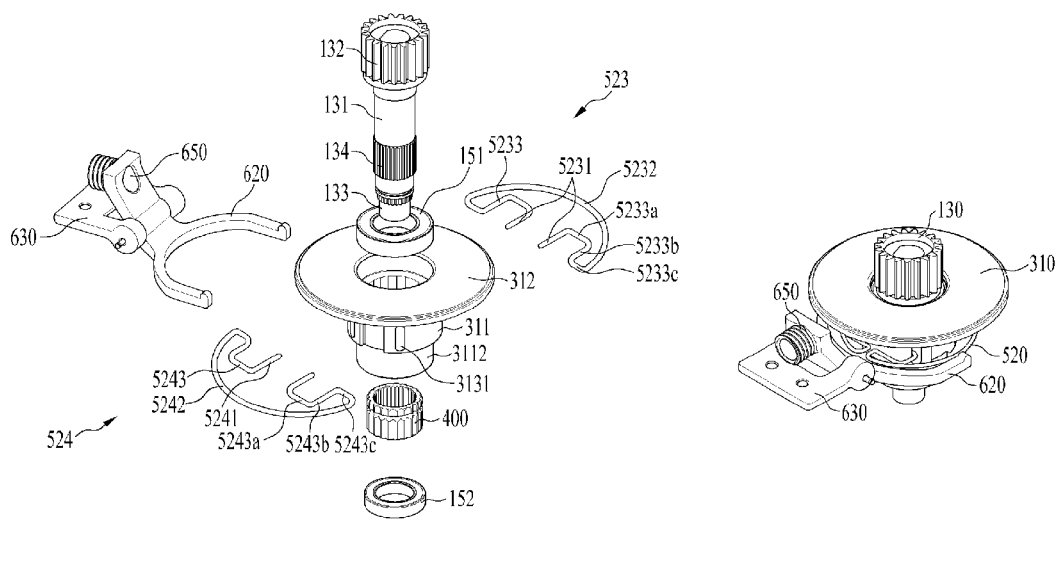
(a)                      (b)

[Fig. 20]
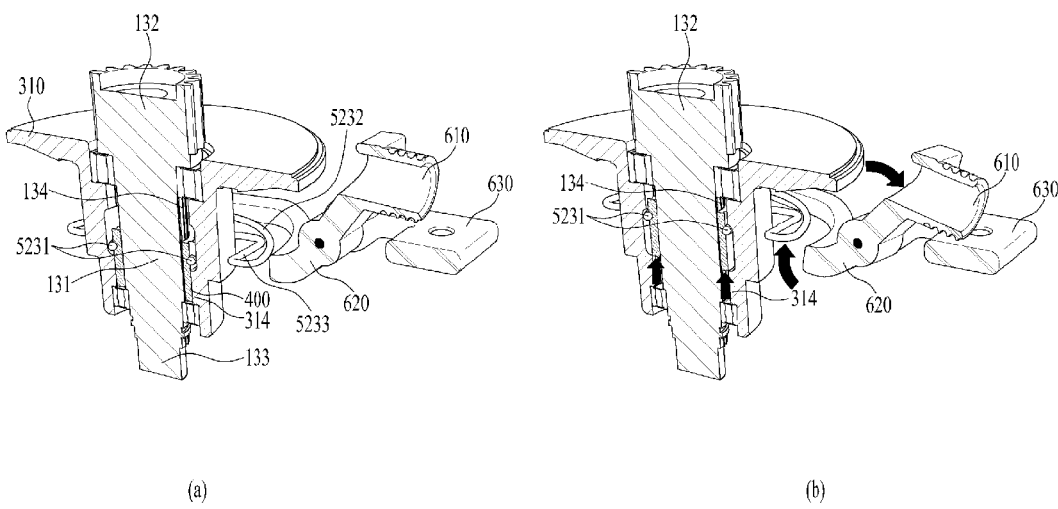
(a)                    (b)
[Fig. 21]
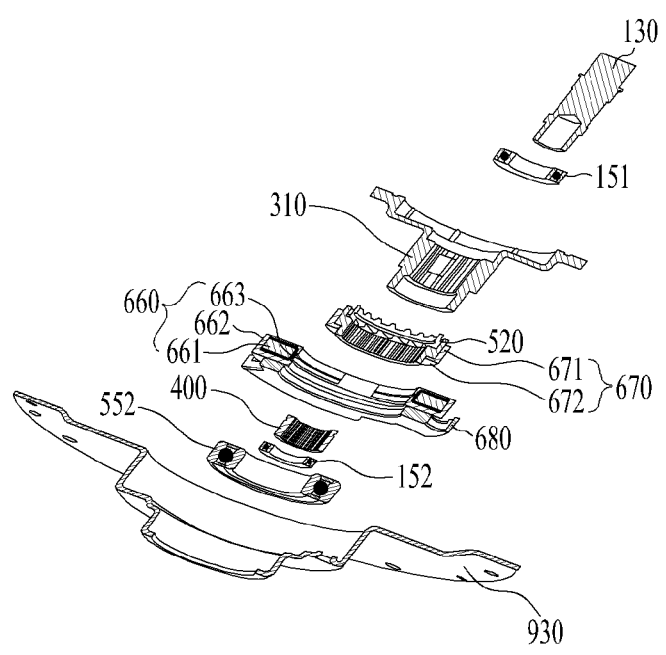

[Fig. 22]
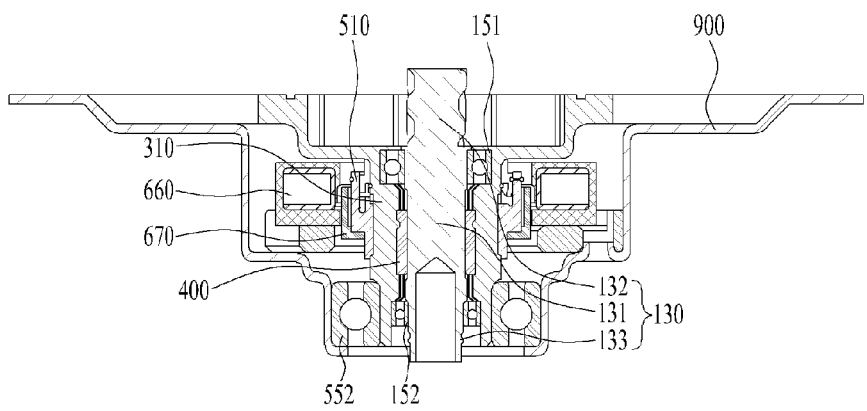
[Fig. 23]
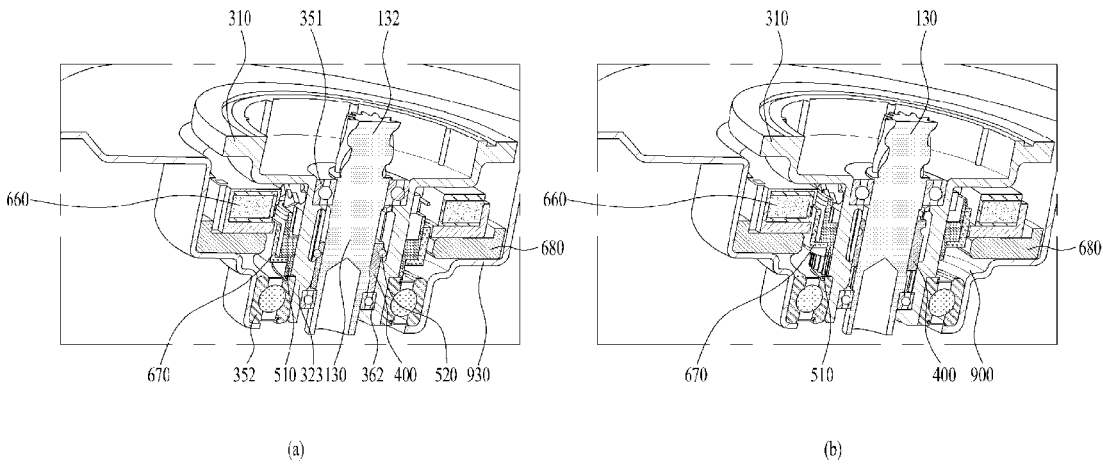
(a)                                    (b)

[Fig. 24]
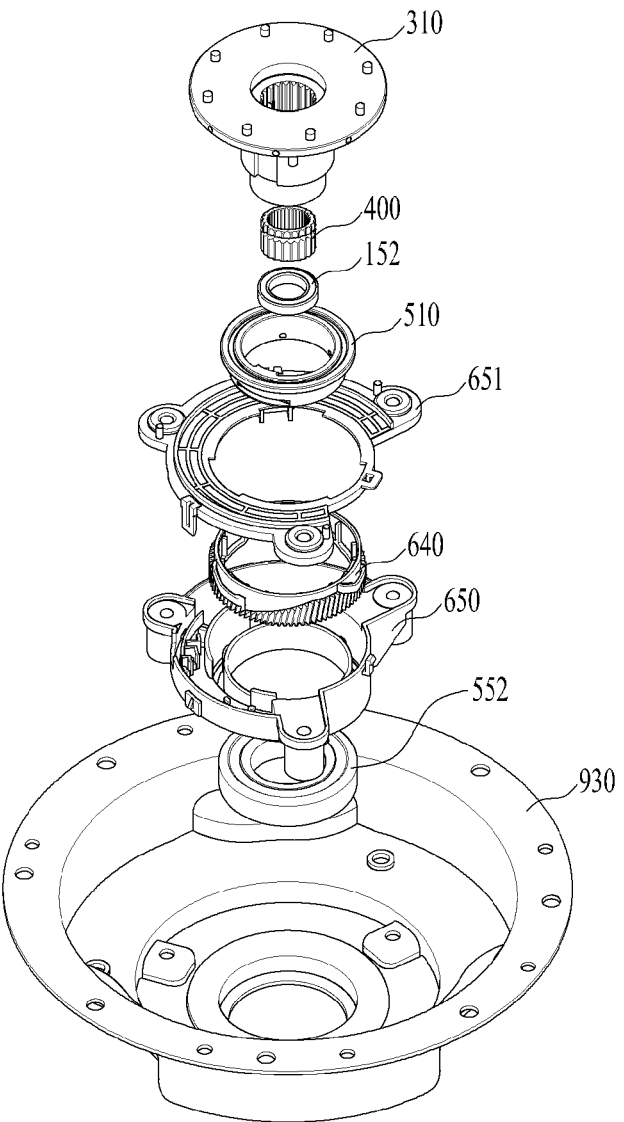
[Fig. 25]
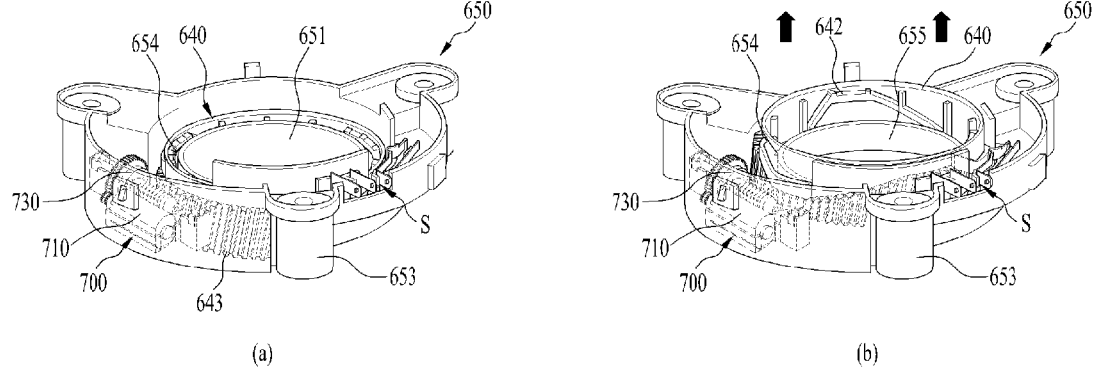
(a)                    (b)

[Fig. 26]
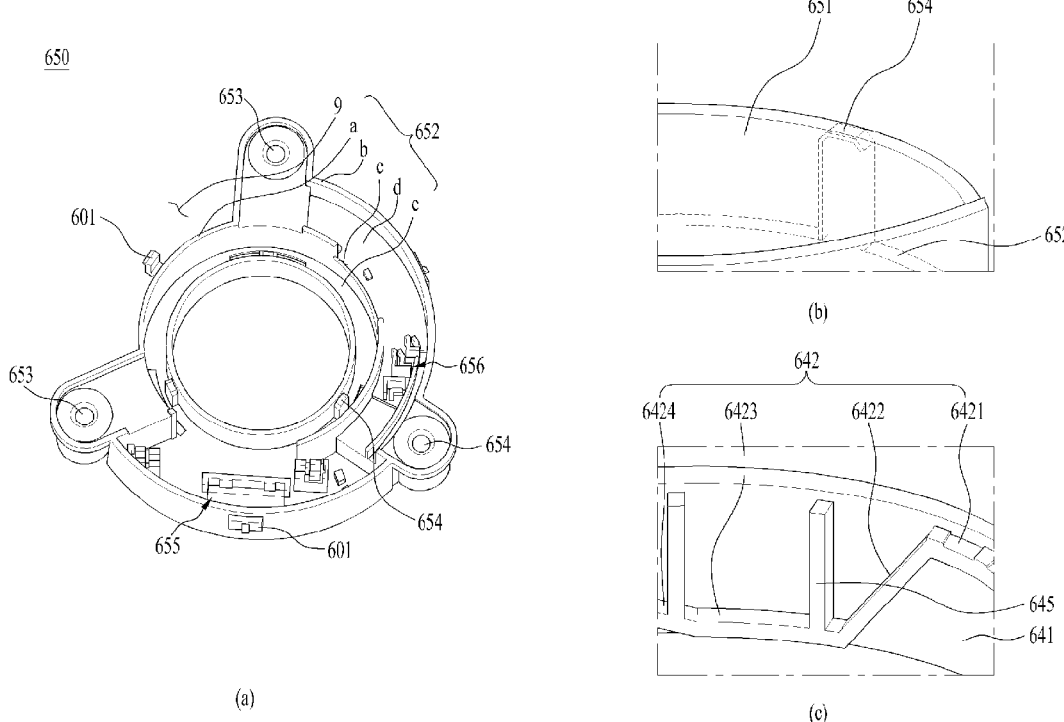
(a)
(b)
(c)
[Fig. 27]
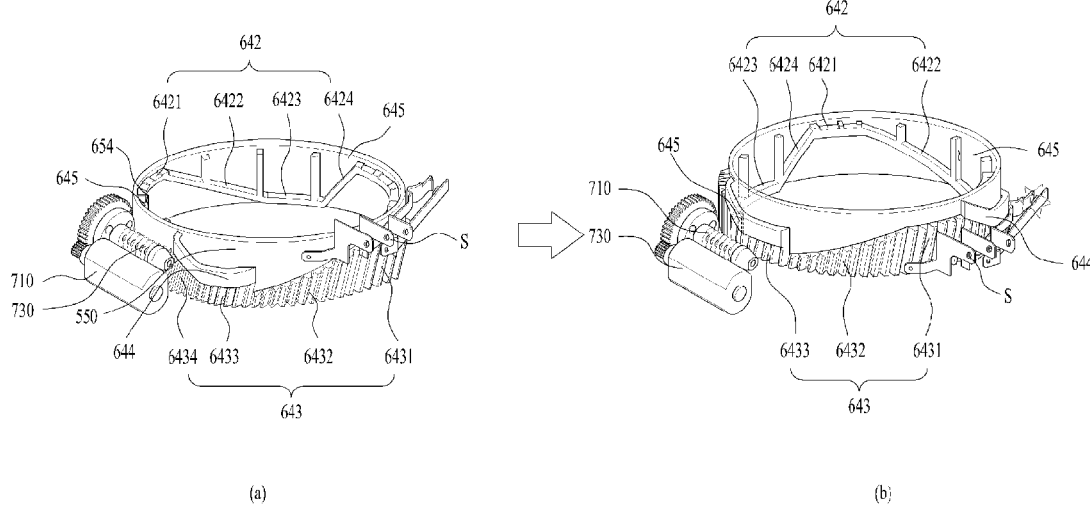
(a)
(b)

LAUNDRY TREATING APPARATUS

CROSS-REFERENCE TO RELATED APPLICATIONS

This application is the National Phase of PCT International Application No. PCT/KR2022/001696, filed on Feb. 3, 2022, which claims priority under 35 U.S.C. § 119(a) to Patent Application No. 10-2021-0013280, filed in the Republic of Korea on Jan. 29, 2021, all of which are hereby expressly incorporated by reference into the present application.

TECHNICAL FIELD

The present disclosure relates to a laundry treating apparatus. More specifically, the present disclosure relates to a laundry treating apparatus having a clutch member capable of rotating a drum and a pulsator independently or simultaneously.

BACKGROUND ART

In general, a laundry treating apparatus is a concept encompassing an apparatus for washing laundry (an object to be washed and an object to be dried), an apparatus for drying the laundry, and an apparatus capable of performing both the washing and the drying of the laundry.

A conventional laundry treating apparatus is classified into a front loading type apparatus for putting the laundry into the apparatus through an inlet defined in a front surface of the apparatus, and a top loading type apparatus for putting the laundry into the apparatus through an inlet defined in a top surface of the apparatus.

In this connection, the conventional top loading type laundry treating apparatus may include a drum that accommodates the laundry therein and rotates, and a pulsator that rotates independently of the drum to improve a washing performance. The pulsator was able to form a water flow independently of the drum by forming a bottom surface of the drum or protruding upwards from the bottom surface of the drum.

In the conventional laundry treating apparatus, a clutch is disposed in a driver that provides power to rotate the drum and the pulsator to control a rotation direction of the drum and the pulsator. See Korean Patent Application Publication No. 10-2008-0092023, Korean Patent Nos. 10-0268263 and 10-0274986, Japanese Patent No. 5940423, U.S. Pat. No. 4,291,556, and the like.

FIG. 1 shows a representative embodiment of a driver and a clutch of a conventional laundry treating apparatus.

A driver 7 of the conventional laundry treating apparatus is disposed beneath a tub for storing water to generate power, and a conventional clutch is coupled to the driver 7 to selectively transmit the power to the drum rotating in the tub and the pulsator rotating independently on the bottom surface of the drum.

Specifically, the driver 7 includes a stator 71 for generating a rotating magnetic field, a rotor 72 rotating by the rotating magnetic field, and a driving shaft 73 coupled to the rotor 72 and rotating.

The clutch of the conventional laundry treating apparatus includes a gearbox 74 rotatably coupled to the driving shaft 73, a housing 5 accommodating the driving shaft 73 and the gearbox 74 therein and coupled to the drum, a rotation shaft 75 that is rotatably accommodated in the housing 5 and is coupled to the gearbox 74 to rotate the pulsator, a coupler 4 selectively connecting the housing 5 and the driver 7 to each other, a moving portion 3 for supporting the coupler 4, and an actuator 2 that operates the moving portion 3 to move the coupler 4.

When the driving shaft 73 rotates, the gearbox 74 and the rotation shaft 75 rotate to rotate the pulsator. However, because the housing 5 may be spaced apart from the driving shaft 73 and the gearbox 74, the housing 5 may not rotate even when the driving shaft 73 rotates. As a result, even when the pulsator rotates, the drum may not rotate.

The housing 5 is formed in a shape of a pipe and serves as a rotation shaft of the drum. Accordingly, only when the coupler 4 connects the housing 5 and the driver 7 to each other, the housing 5 is able to rotate when the driving shaft 73 rotates, and as a result, the drum is able to rotate.

To control this, in the clutch of the conventional laundry treating apparatus, the coupler 4 ascends and descends along an outer circumferential surface of the housing 5 and is selectively coupled to the rotor 72.

When the coupler 4 is coupled to a seating portion 121 of the rotor 72, a rotational force of the rotor 72 is transmitted to the housing 5, so that the housing 5 may rotate. Conversely, when the coupler 4 is spaced apart from the seating portion 121 of the rotor 72, because the rotational force of the rotor 72 is not transmitted to the housing 5, the housing 5 may not rotate, and only the driving shaft 73 and the rotation shaft 75 may rotate.

Because the rotor 72 is located lower than the housing 5 and is spaced apart from the housing 5 by a certain distance, the coupler 4 of the conventional laundry treating apparatus is able to be coupled to the rotor 72 only when descending below a distal end or a lower end of the housing 5.

Therefore, the conventional laundry treating apparatus has a limitation in that a space for the coupler 4 to move below the lower end of the housing 5 is required.

Moreover, because the conventional laundry treating apparatus has the moving portion 3 for supporting and moving the coupler 4, there was a problem in that a space in which the moving portion 3 is disposed must be further secured below the housing 5 and above the rotor 72.

Furthermore, the conventional laundry treating apparatus had a problem in that it is necessary to further secure a free space in which the moving portion 3 moves between a bottom of the housing 5 and the driver 7.

As a result, the conventional laundry treating apparatus had a problem in that the driver and the clutch had to be relatively long, and the washing capacity was not able to be secured that much.

That is, although the component for controlling the rotation of the drum and the pulsator in the conventional laundry treating apparatus should be disposed in the housing 5, there was a contradiction that most of the components of the clutch should be disposed below the housing 5.

In addition, the conventional laundry treating apparatus had a limitation of completely excluding a possibility that the coupler 4 may be installed inside the housing 5 because the coupler 4 is coupled to the rotor 72.

In one example, the housing 5 needs to be rotatably supported because the housing 5 serves as a rotation shaft of the drum.

To this end, the conventional laundry treating apparatus may rotatably support an outer circumferential surface of the housing 5 by placing an upper bearing 51 on a bottom surface of the tub. However, the housing 5 not only has to secure a space for accommodating the gearbox 74 and the like below the upper bearing 51, but also has to extend from the upper bearing 51 by a certain length in order to extend to the rotor 72.

Therefore, because the housing 5 may be misaligned with respect to the upper bearing 51, it is preferable that a lower portion of the housing 5 is more rotatably supported than the gearbox 74.

To this end, the conventional laundry treating apparatus further includes a clutch cover 6 capable of supporting the lower portion of the housing 5. The clutch cover 6 may be spaced downwardly from the upper bearing 51 to rotatably support the housing 5. The clutch cover 6 may be disposed below the gearbox 74 to provide a space in which a lower bearing 52 that rotatably supports the housing 5 may be installed. The clutch cover 6 may be coupled to the bottom surface of the tub to rotatably support the housing 5 through the lower bearing 52.

As a result, the clutch cover 6 may be formed in a shape of a circular box to accommodate the housing 5 therein.

In one example, the more the clutch cover 6 supports the lower end of the housing 5, the more the misalignment of the housing 5 may be prevented. However, because the coupler 4 and the moving portion 3 have to be disposed or reciprocated between the lower end of the housing 5 and the rotor 72, the clutch cover 6 has no choice but to support a portion further spaced apart from the lower end of the housing 5. For example, the clutch cover 6 has a limitation of only being able to rotatably support a lower portion of the gearbox 74.

Therefore, the conventional laundry treating apparatus had a fundamental problem of not being able to support the lower end of the housing 5 even when the clutch cover 6 is disposed. Therefore, there was a possibility that the housing 5 may be misaligned or vibrated at a certain angle with respect to the lower bearing 52 or the clutch cover 6.

Therefore, there was a problem that noise occurs from the clutch or durability is not able to be guaranteed.

Moreover, in the conventional laundry treating apparatus, because the components of the clutch have to be longer for the coupler 4 to selectively couple the housing 5 and the rotor 72 to each other, there was a problem in that the components of the clutch are more easily misaligned or vibrated.

In particular, the coupler 4 and the moving portion 3 have to be installed below or outside the clutch cover 6, so that there was a problem in that a configuration of the clutch is very complicated and installation and repair of the clutch are relatively cumbersome.

DISCLOSURE

Technical Problem

The present disclosure is to provide a laundry treating apparatus that may place a support for lifting and lowering the coupler outside a housing even when the coupler to be coupled with a rotating driving shaft is accommodated inside the housing where a gearbox is accommodated.

The present disclosure is to provide a laundry treating apparatus that blocks an inner diameter of the housing from expanding to be equal to or greater than a diameter of the coupler even when the coupler is disposed inside the housing.

The present disclosure is to provide a laundry treating apparatus in which exterior and interior of the housing are in communication with each other and the coupler accommodated inside the housing is able to ascend and descend.

The present disclosure is to provide a laundry treating apparatus in which a moving portion for reciprocating the support exposed to the outside of the housing is not need to be formed as an electronic product.

The present disclosure is to provide a laundry treating apparatus that blocks the moving portion from physically contacting the support even when the moving portion is formed as the electronic product that operates by receiving a current.

The present disclosure is to provide a laundry treating apparatus in which the moving portion is able to lift and lower the support while rotating along an outer circumferential surface of the housing.

Technical Solution

In order to solve the above problems, the present disclosure installs a coupler for selectively connecting a housing connected to a drum with a driving shaft connected to a pulsator inside the housing.

The coupler may be accommodated inside the housing, and the support may support the coupler from the outside of the housing.

The support may support the coupler through the housing.

The housing may have a through-hole into which the support may be inserted in an outer circumferential surface thereof. The coupler accommodated in the housing may be exposed to be identifiable from the outside through the through-hole.

Both ends of the support may be exposed to the outside of the housing, but a center thereof may be accommodated in the housing to support the coupler.

The support may support both surfaces of the coupler to prevent the coupler from being inclined.

The support may include an insertion body that penetrates or is inserted into the housing to support the coupler. In addition, the support may further include a support body for supporting and lifting and lowering the insertion body exposed to the outside of the housing.

A position of the support body coupled to the housing may be determined such that the insertion body may be assembled at a correct position of the through-hole.

The support body may be formed in a ring shape to surround the housing may rotate with the housing. The support body may be fixed to the housing and rotate integrally with the housing, and may be blocked from rotating independently of the housing.

A position where an insertion region into which the insertion body is inserted in the support body and a through-hole of the housing face each other may be a correct position where the support body and the housing are coupled to each other.

The support body and the housing may be induced to always be coupled to each other at the correct position.

To this end, indicating portions for inducing the through-hole and the insertion region to face each other at the correct position may be disposed on an inner circumferential surface of the support body and an outer circumferential surface of the housing.

For example, a portion of the inner circumferential surface of the support body may protrude, and the outer circumferential surface of the housing may be coupled to the support body by accommodating or seating the protruding portion of the support body therein.

A clutch of the laundry treating apparatus of the present disclosure may further include a moving portion for supporting the support to lift and lower the support. The moving portion may be disposed outside the housing to support the support.

Consequently, even when the coupler is disposed inside the housing, both the moving portion and the support may be disposed outside the housing. As a result, it is possible to prevent a volume of the housing from being enlarged more than necessary, thereby reducing a volume of the clutch.

The moving portion may lift and lower the insertion body by directly supporting the insertion body, and may indirectly lift and lower the insertion body by lifting and lowering the support body.

The moving portion may rotate in a height direction to lift and lower the support. The moving portion may lift and lower the support while supporting the support body using a seesaw or lever principle.

The moving portion may physically reciprocate to lift and lower the support, so that there may be no need for the moving portion to be formed as an electronic component.

Accordingly, a structure of the moving portion may be simplified, and reliability of lifting and lowering the support may be greatly improved.

The moving portion may be disposed to overlap in the height direction with the housing, and may not deviate outwardly of a lower end of the housing.

In addition, the moving portion may not come into contact with the support to lift and lower the support. For example, the moving portion may generate an electromagnetic field, and the support may selectively ascend or descend by the electromagnetic field.

Accordingly, a component for connecting or contacting the moving portion and the support to each other may be omitted, and noise and vibration may be improved.

The moving portion may lift and lower the support by directly rotating by an actuator below the support. The moving portion may rotate at least once along the outer circumferential surface of the housing.

The moving portion may repeat ascending and descending while continuously rotating in one direction.

As a result, the actuator only needs to be continuously driven in one direction, so that control of the actuator may be simplified, and all outputs that the actuator may generate may be utilized.

Advantageous Effects

The present disclosure may lift and lower the coupler accommodated inside the housing from the outside of the housing.

The present disclosure may place all of the plurality of components that move the coupler outside of the housing even when the coupler is accommodated inside the housing. Accordingly, expansion of a volume of the housing is blocked, so that an overall volume of the clutch may be maintained or reduced.

In addition, the present disclosure may ensure convenience of installation, assembly, and repair of the clutch by disposing all of the plurality of components for moving the coupler outside the housing.

The present disclosure may lift and lower the coupler by utilizing all the outputs of the actuator.

The present disclosure may reduce an overall height of the clutch by disposing the coupler and the plurality of components for moving the coupler to overlap in the height direction with the housing.

BRIEF DESCRIPTION OF THE DRAWINGS

FIG. 1 shows a conventional laundry treating apparatus.

FIG. 2 shows a basic structure of a laundry treating apparatus according to the present disclosure.

FIG. 3 shows a clutch of a laundry treating apparatus according to the present disclosure.

FIG. 4 shows an operating structure of a clutch according to the present disclosure.

FIG. 5 shows one embodiment of a clutch.

FIG. 6 is an exploded perspective view of a clutch in FIG. 5.

FIG. 7 is a view showing a coupling structure between a coupler and a driving shaft in FIG. 5.

FIG. 8 is a view showing a coupling structure between a coupler and a housing in FIG. 5.

FIG. 9 shows structures of a housing and a support in FIG. 5.

FIG. 10 shows an exploded perspective view of a support in FIG. 5.

FIG. 11 shows an operation scheme of a support in FIG. 5.

FIG. 12 shows a structure of a support in FIG. 5.

FIG. 13 shows an installation structure of a support in FIG. 5.

FIG. 14 shows a cross-sectional structure of a housing in which a support is installed.

FIG. 15 shows a structure of a support in FIG. 5 lifting and lowering a coupler.

FIG. 16 shows a support driving structure that may be applied to a clutch.

FIG. 17 shows a structure in which an actuator drives a support.

FIG. 18 shows a structure in which a clutch of the present disclosure is installed on a tub.

FIG. 19 shows an additional embodiment of a support of a clutch of the present disclosure.

FIG. 20 shows an operating structure of a support in FIG. 19.

FIG. 21 shows an additional embodiment of a moving portion of a clutch of the present disclosure.

FIG. 22 shows a cross-section of a clutch to which a moving portion in FIG. 21 is applied.

FIG. 23 shows an operating structure of a moving portion in FIG. 21.

FIG. 24 shows another embodiment of a moving portion of a clutch of the present disclosure.

FIG. 25 shows a structure of a moving portion in FIG. 24.

FIG. 26 shows an operating principle of a moving portion in FIG. 24.

FIG. 27 shows an aspect in which a moving portion in FIG. 24 lifts and lowers a support.

MODE FOR INVENTION

Hereinafter, embodiments disclosed in the present specification will be described in detail with reference to the accompanying drawings. In the present specification, even in different embodiments, the same and similar reference numerals are assigned to the same and similar components, and the description is replaced by the first description. As used herein, the singular expression includes the plural expression unless the context clearly dictates otherwise. In addition, in describing the embodiments disclosed in the present specification, when it is determined that detailed descriptions of related known technologies may obscure the gist of the embodiments disclosed in the present specification, the detailed description thereof will be omitted. In addition, it should be noted that the accompanying drawings are only for easy understanding of the embodiments disclosed in the present specification, and should not be construed as limiting the technical spirit disclosed in the present specification by the accompanying drawings.

FIG. 2 shows an embodiment of a structure of a laundry treating apparatus of the present disclosure.

The laundry treating apparatus of the present disclosure may include a cabinet 10 forming an appearance of the apparatus, a tub 20 accommodated in the cabinet 10 to store water therein, a drum 30 rotatably disposed in the tub 20 to accommodate laundry therein, a water supply 80 for supplying water to the tub 20, and a drainage 60 for discharging the water of the tub 20 to the outside of the cabinet 10.

The cabinet 10 may include an inlet 12 into which the laundry is put, and a door for opening and closing the inlet 12 at a top surface thereof.

A control panel including an input unit for receiving a command to operate the laundry treating apparatus and a display for displaying a state of the laundry treating apparatus may be installed on the cabinet 10.

The control panel may include a controller for operating the laundry treating apparatus.

The water supply 80 may include a water supply valve 81 coupled to the cabinet 10 and receiving water from an external water supply source, a water supply pipe 82 extending from the water supply valve 81 and receiving water, a detergent box 83 in communication with the water supply pipe 82 and into which detergent is put, and a water supply pipe 84 extending from the detergent box 83 and supplying water to the tub 20. The detergent box 83 may be disposed inside the cabinet 10 or at the front of the cabinet 10.

The drainage 60 may include a discharge pipe 61 in communication with a bottom of the tub 20 to discharge the water of the tub 20, a drain pump 62 in communication with the discharge pipe 61 to discharge the water to the outside of the cabinet 10, and a drain pipe 63 extending from the drain pump 62 to the outside of the cabinet 10.

The laundry treating apparatus of the present disclosure may further include a suspension 70 for fixing the tub 20 inside the cabinet 10. The suspension 70 may include a support bar for coupling one side of the tub 20 and one surface of the cabinet 10 to each other, and a damper or a spring coupled to the support bar to damp vibration.

The laundry treating apparatus of the present disclosure may further include a pulsator 40 that is rotatably accommodated in the drum 30 to agitate the laundry or form a water flow. The pulsator 40 may be rotatably disposed on a bottom surface of the drum 30, and may protrude by a predetermined height toward the inlet 12.

The laundry treating apparatus of the present disclosure may further include a driver 100 coupled to the tub 20 to provide power to rotate the pulsator 40 and the drum 30, and a clutch C coupled to the driver 100 to transmit the power to at least one of the pulsator 40 and the drum 30.

The clutch C may be controlled by the aforementioned controller.

The clutch C may be disposed between the driver 100 and the pulsator 40 to selectively transmit the power of the driver 100 to at least one of the pulsator 40 and the drum 30. Specifically, the clutch C may transmit a rotational force generated by the driver 100 to both the drum 30 and the pulsator 40 or to only one of the drum 30 and the pulsator 40.

The laundry treating apparatus of the present disclosure may control the clutch C to determine whether to rotate one of the drum 30 and the pulsator 40 or whether to rotate both the drum 30 and the pulsator 40.

For example, the laundry treating apparatus of the present disclosure may rotate the drum 30 and the pulsator 40 in opposite directions or rotate only the pulsator 40 in a washing process through the clutch C. In addition, the laundry treating apparatus of the present disclosure may rotate the drum 30 and the pulsator 40 integrally in a dehydration process through the clutch C.

FIG. 3 shows one embodiment of the driver 100 and the clutch C of the laundry treating apparatus of the present disclosure.

The driver 100 of the laundry treating apparatus of the present disclosure may include a stator 110 disposed below the tub 20 to generate a rotating magnetic field, a rotor 120 rotated by the stator 110, and a driving shaft 130 coupled to the rotor 120 and rotating.

The rotor 120 may include a magnetic force generating portion 123 for generating a rotational force by the rotating magnetic field generated by the stator 110, a rotor body 122 to which the magnetic force generating portion 123 is coupled or extended from the magnetic force generating portion 123, and a seating portion 121 disposed at a center of the rotor body 122 and to which the driving shaft 130 is fixed or coupled.

The clutch C of the laundry treating apparatus of the present disclosure may be coupled to the driving shaft 130, the drum 30, and the pulsator 40 to rotate both the drum 30 and the pulsator 40 or selectively rotate the drum 30 and the pulsator 40 when the driving shaft 130 rotates.

The tub 20 may include a bottom surface 22 and a bearing housing 23 to which the driver 100 or the clutch C is coupled at a center of the bottom surface 22. The bearing housing 23 may be made of a metal material to stably support the driver 100, and may be manufactured by injection molding on the bottom surface 22. In this connection, the bearing housing 23 coupled to the bottom surface 22 of the tub 20 may be defined as the first bearing housing 23.

The clutch C of the laundry treating apparatus of the present disclosure may include a gear assembly 340 that rotates in engagement with the driver 100, a rotation shaft 200 connected to the gear assembly 340 to rotate the pulsator 40, a housing 300 coupled to the drum 30 to rotate the drum 30 and rotatably accommodating the gear assembly 340 and the rotation shaft 200 therein, and a coupler 400 capable of connecting the driver 100 and the housing 300 to each other to selectively rotate the housing 300.

The rotation shaft 200 may include a pulsator coupling portion 210 coupled to the pulsator 40 at an upper end or a free end thereof. Accordingly, when the rotation shaft 200 rotates, the pulsator 40 may rotate.

The coupler 400 of the laundry treating apparatus of the present disclosure may be accommodated in the housing 300. The coupler 400 may not be disposed outside the housing 300, and may be disposed to be reciprocally movable inside the housing 300. Therefore, in the laundry treating apparatus of the present disclosure, there is no space occupied by the coupler 400 independently at the outside of the housing 300, so that it is possible to reduce an overall volume of the clutch C to that extent.

In one example, the coupler 400 is disposed to selectively couple the driving shaft 130 and the housing 300 to each other inside the housing 300. Accordingly, because the coupler 400 has no reason to be in contact with or be coupled to the rotor 120, there is no need for the coupler 400 to deviate or be exposed to the outside of the housing 300.

The coupler 400 may not move to the outside of an upper end or a lower end of the housing 300, and the laundry treating apparatus of the present disclosure may omit a space for the coupler 400 to move at the lower end of the housing 300.

The clutch C may include a support 500 for lifting and lowering the coupler 400 to separate or couple the driver 100 and the housing 300 from or to each other, a moving portion 600 disposed outside the housing 300 to lift and lower the support 500, and an actuator 700 that operates the moving portion 600 to provide power for reciprocating the support 500 and the coupler 400.

The moving portion 600 and the actuator 700 may be disposed outside the housing 300 due to a space limit inside the housing 300. In this connection, the support 500 may also be disposed outside the housing 300 to be coupled to or supported by the moving portion 600.

Because the coupler 400 is accommodated in the housing 300 and is blocked from deviating from the housing 300, the support 500 may also not need to deviate outwardly from the upper end or the lower end of the housing 300.

That is, the support 500 may be disposed outside the housing 300, but may not be disposed in a space between the lower end of the housing 300 and a top of the stator 110 or the rotor 120.

In addition, because the moving portion 600 is also disposed to support the support 500, the moving portion 600 may not be disposed in the space between the lower end of the housing 300 and the top of the stator 110 or the rotor 120.

As a result, because most of the components of the clutch C do not deviate outwardly from the lower end of the housing 300 and do not move outwardly of the lower end of the housing 300, a space itself for installing the components of the clutch C may be omitted between the lower end of the housing 300 and the rotor 120.

In other words, at least one of the coupler 400, the support 500, and the moving portion 600 may be disposed to entirely overlap the housing 300 in a height direction.

In addition, because the lower end of the housing 300 and the rotor 120 are not coupled to the coupler 400, the lower end of the housing 300 and the rotor 120 may have a simple surface.

Accordingly, the laundry treating apparatus of the present disclosure may design the housing 300 and the stator 110 or the rotor 120 to be more compact, and may reduce overall heights of the driver 100 and the clutch C.

As a result, a length of the tub 20 inside the cabinet 10 becomes greater to secure a washing capacity. In addition, because the height of the clutch C itself may be reduced, it is possible to prevent the clutch C itself from being misaligned or vibrated.

As a result, the coupler is accommodated and disposed inside the housing 300, so that the overall height or volume of the clutch C may be reduced, and a space in which the height of the tub 20 or the drum 30 may be further expanded may be secured.

In addition, a gap between the tub 20 and the driver 100 may become smaller.

The housing 300 may be selectively connected to the driving shaft 130 through the coupler 400. When the housing 300 is connected to the driving shaft 130, the housing 300 may rotate simultaneously with the driving shaft 130 and may rotate the drum 30 coupled to the housing 300.

The housing 300 may include a rotating housing 330 that rotatably accommodates the rotation shaft 200 therein and is coupled to the drum 30, a gear housing 320 extending from the rotating housing 330 or coupled to the rotating housing

330 to accommodate the gearbox 340 therein, and a connection housing 310 coupled to the gear housing 320 to rotatably accommodate the coupler 400 and the driving shaft 130 therein.

The connection housing 310 may have a diameter larger than a diameter of the driving shaft 130 such that the driving shaft 130 may freely rotate therein, and the rotating housing 330 may also have a diameter larger than a diameter of the rotation shaft 200 such that the rotation shaft 200 may freely rotate therein.

The connection housing 310 may not rotate together with the driving shaft 130 even when the driving shaft 130 rotates, and the rotating housing 330 may not rotate together with the rotation shaft 200 even when the rotation shaft 200 rotates.

The housing 300 may rotate independently of the rotation shaft 200 and the driving shaft 130. Accordingly, when the drum 30 is coupled to the housing 300, the drum 20 may not be affected by the rotation of the rotation shaft 200 and the driving shaft 130.

In one example, the gear housing 320 may have a diameter larger than the diameters of the rotating housing 330 and the connection housing 310 in order to accommodate the gear assembly 340 therein.

Accordingly, when the gear housing 320 is supported on the bottom surface 22 or a bearing housing 26 of the tub 20, the entire housing 300 may be stably disposed beneath the tub 20.

Because the connection housing 310 is disposed beneath the gear housing 320 to accommodate the driving shaft 130 therein, the drum 30 may be coupled to the rotating housing 330.

The rotating housing 330 may serve as the rotation shaft of the drum 30. Accordingly, the rotating housing 330 may have a drum serration 331 coupled to a bottom surface of the drum on an outer circumferential surface thereof.

The bottom surface of the drum 30 may be coupled to the outer circumferential surface of the rotating housing 330. Accordingly, when the rotating housing 330 rotates, the drum 30 may rotate together with the rotating housing 330.

In order to rotate the drum 30, the housing 300 needs to be selectively coupled to the driver 100. That is, when the housing 300 is rotated by the driver 100, the drum 30 may be rotated independently of the rotation of the rotation shaft 200. Accordingly, the drum 30 may rotate independently of the pulsator 40.

To this end, the coupler 400 may selectively connect or couple the housing 300 and the driver 100 to each other. In the present specification, the coupler 400 coupling the driver 100 and the housing 300 to each other means that the power of the driver 100 may be transmitted to the housing 300.

For example, it may mean a state in which the coupler 400 rotates the housing 300 rotates at the same rpm as the rotor 120 or the driving shaft 130.

The housing 300 is disposed above the rotor 120 to be spaced apart from the rotor 120, and accommodates the driving shaft 130 therein.

Accordingly, the coupler 400 may selectively connect the driving shaft 130 and the housing 300 to each other. Accordingly, the coupler 400 may be blocked from being disposed between the housing 300 and the rotor 120 to connect the rotor 120 and the housing 300 to each other.

In addition, the coupler 400 may connect the driving shaft 130 and the housing 300 to each other even when the coupler 400 is accommodated in the housing 300. For example, an inner surface of the coupler 400 may be connected to an outer circumferential surface of the driving shaft 130 and an outer surface of the coupler 400 may be connected to an inner circumferential surface of the housing 300 to transmit the power of the driving shaft 130 to the housing 300.

Accordingly, because the coupler 400 is disposed overlapping the driving shaft 130 and the housing 300, a space separately occupied by the coupler 400 may be saved. In addition, because the coupler 400 is in surface contact along a circumference of the driving shaft 130 and in surface contact along a circumference of the housing 300, the power of the driving shaft 130 may be stably transmitted to the housing 300.

In addition, because the coupler 400 is disposed to reciprocate inside the housing 300, the space for the coupler 400 to move between the housing 300 and the rotor 120 may be saved.

The coupler 400 may be accommodated in the connection housing 310, and may be reciprocally movable in the connection housing 310 along a longitudinal direction of the driving shaft 130.

The coupler 400 may connect or separate the connection housing 310 and the driving shaft 130 to or from each other while moving in the longitudinal direction of the driving shaft 130. A detailed embodiment will be described later.

In one example, the coupler 400 may move along the longitudinal direction of the driving shaft 130 only when receiving the power from the exterior. Accordingly, the support 500 may support the coupler 400, and the support 500 may move vertically by receiving the power from the actuator 700. The actuator 700 may directly move the support 500, but may reciprocate the support 500 through the moving portion 600 capable of moving the support 500 by supporting the support 500.

Specific structures of the actuator and the moving portion 600 will be described later.

For example, the clutch C of the present disclosure may be designed such that the coupler 400 connects the housing 300 and the driving shaft 130 to each other when the power is generated from the actuator and separate the housing 300 and the driving shaft 130 from each other when the power is cut off from the actuator.

To this end, the clutch C of the present disclosure may further include a restoring portion 800 capable of restoring a position of the coupler 400 when the power of the actuator is cut off.

The restoring portion 800 may restore the position of the coupler 400 by directly pushing or pulling the coupler 400. In this case, the restoring portion 800 may also be disposed inside the housing 300 to press or pull the coupler 400.

In one example, the restoring portion 800 may restore or move the support 500 or the moving portion 600 to an original position thereof to restore the position of the coupler 400.

For example, the clutch C of the present disclosure may be constructed such that the driving shaft 130 and the housing 300 are connected to each other when the coupler 400 ascends. The restoring portion 800 may lower the support 500 to lower the coupler 400 to separate the driving shaft 130 from the housing 300 from each other.

In addition, the restoring portion 800 may be disposed outside the housing 300. The restoring portion 800 may be constructed such that one end thereof is in contact with a bottom of the gear housing 320 or the connection housing 310 and the other end thereof is in contact with the support 500. The restoring portion 800 may be made of an elastic material, or may be formed as a spring or the like.

The rotating housing 330 may be inserted into the bearing housing 23 disposed on a bottom surface of the tub 20 to be coupled to the drum 30. The bearing housing 23 may include an external bearing 350 for rotatably supporting the rotating housing 330.

In addition, the laundry treating apparatus of the present disclosure may further include an inner bearing 360 rotatably supporting the driving shaft 130 inside the housing 300.

The external bearing 350 may be in contact with an outer circumferential surface of the housing 300 to rotatably support the housing 300, and the inner bearing 360 may be in contact with an inner circumferential surface of the housing 300 to rotatably support the driving shaft 130.

In the laundry treating apparatus of the present disclosure, excluding a height occupied by the gear assembly or the housing 300 and a thickness of the driver 100 itself, there is no need to secure a separate space between the tub 20 and a top surface of the driver 100.

In other words, because the coupler 400 and the support 500 are disposed overlapping the housing, the overall thickness or height of the clutch C may be greatly reduced.

Because the height of the clutch C and the thickness of the driver itself overlap, a total length from the bottom surface of the tub to a lower end of the driver is smaller than a sum of the length of the clutch C itself and the thickness of the driver itself.

Therefore, the driver 100 may be installed in closer contact with the bottom surface of the tub 20, and the height of the tub 20 or the drum 30 may be secured greater, so that the washing capacity may be further secured.

Although the coupler 400 is accommodated inside the housing 300, the support 500 may be disposed outside the housing 300. Therefore, it is possible to prevent unnecessary expansion of the interior of the housing 300, and it is possible to prevent a complex component such as the support 500 and the moving portion 600 for lifting and lowering the support 500 from being installed inside the housing 300. Accordingly, a moment of inertia of the housing 300 may be reduced. In addition, it is possible to increase convenience of installation, assembly, and repair of the support 500 and the moving portion 600 by disposing the complicated clutch Components such as the support 500, the moving portion 600, and the like outside the housing 300.

In one example, the connection housing 310 in the housing 300 also performs a role of the drum 30. When the housing 300 is supported only by the external bearing 350 coupled to the bearing housing 23, the connection housing 310 and the entire driver 100 extending below the external bearing 350 may be misaligned or vibrated during the operation of the driver 100, thereby generating noise.

Accordingly, in order to prevent this, the clutch C may further include a bearing housing 900 for rotatably supporting the connection housing 310.

Because the bearing housing 900 is coupled to the first bearing housing 23 to rotatably support a rotation bearing or a support bearing, so that the bearing housing 900 may be defined as a second bearing housing 900 so as to be distinguished from the first bearing housing 23.

Because the second bearing housing 900 blocks the internal component of the clutch C from being exposed to the outside, the second bearing housing 900 may also be defined as a clutch cover 900. Hereinafter, the second bearing housing 900 will be described as defined as a clutch cover 900.

The clutch cover 900 may be coupled to the bottom surface of the tub 20 to rotatably support the connection housing 310 while accommodating the housing 300 therein.

The coupler 400 is accommodated in the connection housing 310. Because the coupler 400 is not coupled to a distal end of the connection housing 310, the clutch cover 900 may be disposed to support a lower end or a free end of the connection housing 310.

Accordingly, because a distal end of the housing 300 is supported by the clutch cover 900, the entire housing 300 may be prevented from being misaligned or vibrated. Therefore, a performance of the gear assembly 340 may be guaranteed, so that reliability of the clutch C may be greatly improved.

In addition, because the clutch cover 900 supports the distal end of the housing 300, vibration amplitudes of the clutch C and the driver 100 may be greatly reduced, so that noise occurrence or lowering of durability of the driver 100 and the clutch C may be prevented.

The clutch cover 900 may support the outer circumferential surface of the connection housing 310 through the external bearing 350.

In addition, even when it is not the distal end or the lower end of the connection housing 310, the clutch cover 900 may rotatably support the outer circumferential surface of the connection housing 310 that is further spaced downwardly apart from the gear housing 320. The clutch cover 900 may rotatably support a region more biased toward the lower end of the upper end and the lower end of the connection housing 310.

As a result, the external bearing 350 coupled to the clutch cover 900 and supporting the connection housing 310 may be disposed lower than or closer to the rotor 120 than the coupler 400 or the support 500.

For this reason, at least a portion of at least one of the coupler 400, the support 500, and the moving portion 600 may be accommodated in the clutch cover 900.

Because the clutch cover 900 is formed in a shape of a casing or a disk, the clutch cover 900 may accommodate all of the coupler 400, the housing 300, and the support 500 therein, and may also accommodate at least a portion of the moving portion 600 therein.

The clutch cover 900 may be coupled to the bottom surface of the tub 20 to accommodate therein and protect the housing 300, the support 500, and the moving portion 600.

Accordingly, it is possible to prevent the clutch C from coming into contact with the rotor 120 or foreign substances or from being damaged by the rotor 120 or the foreign substances.

Furthermore, because at least some of the components of the clutch C may be installed inside the clutch cover 900 and then coupled to and separated from the tub 20, the clutch C may be manufactured as the module, and installation, repair, and replacement of the clutch C may be easy.

FIG. 4 shows an operational embodiment of the clutch C of the present disclosure.

Referring to (a) in FIG. 4, the driving shaft 130 may include a shaft body 131 that is rotatably accommodated in the connection housing 310, a first distal end 132 that may be disposed at an upper end of the shaft body 131 and may be coupled to the gear assembly 340, and a second distal end 133 that may be disposed at a lower end of the shaft body 132 and may be coupled to the rotor 120.

The shaft body 131 may be longer than the connection housing 310, and the first distal end 132 and the second distal end 133 may be exposed to the outside from the connection housing 310.

The gear assembly 340 may be coupled to or engaged with the first distal end 132 inside the gear housing 320.

The gear assembly 340 may include a sun gear 341 disposed on an outer circumferential surface of the first distal end 132, at least two planetary gears 342 disposed along a circumference of the sun gear 341 and rotating in engagement with the sun gear 341, a ring gear 343 that accommodates the planetary gears 342 therein, is formed in a ring shape, and is engaged with the planetary gears 342 on an inner circumferential surface thereof, and a carrier 344 rotatably disposed inside the gear housing 320 to provide a rotation shaft of the planetary gears 342.

The sun gear 341 may be coupled to the first distal end 132. That is, the sun gear 341 may accommodate the first distal end 132 therein.

In addition, the sun gear 341 may be formed integrally with the first distal end 132. That is, a serration is disposed on an outer circumferential surface of the first distal end 132, so that the sun gear 341 may be disposed.

In either case, the sun gear 341 may have the serration on the outer circumferential surface, and may rotate at the same rpm as the driving shaft 130.

The sun gear 341 may have a disk-shaped cross-section, and the planetary gears 342 may have a disk-shaped cross-section. The ring gear 342 may be formed in a ring shape.

The ring gear 343 may have a much larger diameter than the sun gear 341. Accordingly, the plurality of planetary gears 342 may be disposed between the sun gear 341 and the ring gear 343.

The ring gear 343 may be fixed to the inner circumferential surface of the housing 300, or may rotate independently of the housing 300.

Although not shown, a brake for fixing the housing 300 or inducing rotation of the housing 300 by being in contact with the outer circumferential surface of the housing 300 may be further included.

The planetary gears 342 may have a serration that may be rotated in engagement with the sun gear 341 on the outer circumferential surface thereof, and the ring gear 343 may have a serration that may be rotated in engagement with the planetary gears 342 on the inner circumferential surface thereof.

The rotation shaft 200 may be formed integrally with the carrier 344 or may be coupled to the carrier 344. The rotation shaft 200 is separated from the driving shaft 130. Accordingly, the rotation shaft 200 may rotate independently without being directly affected by the rotation of the driving shaft 130.

When the sun gear 341 rotates, the planetary gears 342 are engaged with the sun gear 341 and rotate in a direction opposite to a rotation direction of the sun gear 341. In this connection, the planetary gears 342 may also be engaged with the ring gear 343. In this connection, when the ring gear 343 is fixed to the gear housing 320, the planetary gears 342 rotate in the same direction as the sun gear 341 along a circumference of the sun gear 341 by action-reaction. Accordingly, the carrier 344 may rotate in a direction the same as a direction in which the planetary gears 342 rotate along the circumference of the sun gear 341, and the rotation shaft 200 may rotate in the same direction as the sun gear 341. Accordingly, the pulsator 40 may rotate in the same manner as the sun gear 341.

Depending on whether the carrier 344 or the housing 300 is constrained, the drum 30 may rotate in a direction opposite to the rotation direction of the pulsator 40, and the drum 30 may not rotate even when the pulsator 40 rotates.

In one example, when the housing 300 is fixed to the driver 100 and rotates the same as the driving shaft 130, because the ring gear 343 and the sun gear 341 rotate in the same direction and the planetary gears 342 are fixed without rotating, the carrier 344 connected to the rotation shaft of the planetary gears 342 also rotates in the same manner as the driving shaft 130.

Accordingly, the drum 40 may rotate at the same rpm as the driving shaft 130 by the rotating housing 330, and the pulsator 40 may also rotate at the same rpm as the driving shaft 130.

The connection housing 310 may rotate integrally with the gear housing 320. The connection housing 310 may be fixedly coupled to the gear housing 320, and may be formed integrally with the gear housing 320.

Accordingly, the coupler 400 may be disposed to selectively connect the driving shaft 130 and the connection housing 310 to each other to determine whether the pulsator 40 rotates independently of the drum 30 or whether the pulsator 40 and the drum 30 rotate simultaneously.

The coupler 400 may reciprocate along the longitudinal direction of the driving shaft 130 inside the connection housing 310. In this connection, one of the driving shaft 130 and the connection housing 310 may be coupled to the coupler 400 and rotate together with the coupler 400 only when the coupler 400 is at a specific position and may be separated from the coupler 400 and rotate independently of the coupler 400 when the coupler 400 is at a position different from the specific position.

The separation of the coupler 400 may mean a state capable of being in contact with the coupler 400, but not engaged with the coupler 400, and thus, capable of rotating independently of the coupler 400.

For example, the coupler 400 may be separated from at least one of the connection housing 310 and the driving shaft 130 when the coupler 400 is located at a lower portion of the connection housing 310, but may be coupled to both the connection housing 310 and the driving shaft 130 when the coupler 400 ascends in or is located at an upper portion of the connection housing 310.

In addition, the support 500 may be connected to the coupler 400 at a position at least overlapping the coupler 400 to lift and lower the coupler 400. The support 500 may be disposed on the outer circumferential surface of the connection housing 310 to support the coupler 400.

The moving portion 600 may lift and lower the support 500 outside the connection housing 310. For example, the moving portion 600 may rotate by the actuator 700 while supporting a lower portion of the support 500 so as to lift the support 500 upwards.

The restoring portion 800 may be disposed to be compressible between the connection housing 310 and the support 500. Accordingly, when the support 500 is not supported by the moving portion 600, the restoring portion 800 may immediately push the support 500 to lower the coupler 400.

The driving shaft 130 may be rotatably supported by a second bearing 160 on the connection housing 310. The second bearing 160 may include an upper bearing 161 supporting an upper portion of the shaft body 131 and a lower bearing 162 supporting a lower portion of the shaft body 131.

The shaft body 131 may further include a seated body 1311 that may be seated on the upper bearing 161 below the first distal end 132. The seated body 1311 may have a diameter larger than a diameter of the first distal end 132.

The inner bearing 360 may include a driving bearing 362 disposed at the lower portion of the connection housing 310 to support the outer circumferential surface of the driving shaft 130, and a shaft bearing 361 disposed at the upper portion of the connection housing 310 to support the first distal end 132 of the driving shaft 130.

The coupler 400 may reciprocate between the shaft bearing 361 and the driving bearing 362.

In one example, because the external bearing 350 must rotatably support the housing 300, a diameter or a thickness of the external bearing 350 may be greater than that of the inner bearing 360.

The external bearing 350 may include an upper bearing or a rotating bearing 351 disposed on the bottom surface 22 or the bearing housing 23 of the tub to rotatably support the rotating housing 330, and a lower bearing or a support bearing 352 coupled to the clutch cover 900 to rotatably support the connection housing 310.

Both the rotating bearing 351 and the support bearing 352 rotatably support the housing 300.

The support 500 may reciprocate between a top of the support bearing 352 and the upper end of the connection housing 310 or the gear housing 320.

However, even when the support bearing 352 and the driving bearing 362 are disposed overlapping, a vertical level difference L occurs between the top surface of the support bearing 352 and the top surface of the driving bearing 362 due to a thickness difference.

Accordingly, a difference by the vertical level difference L may occur between a region in which the coupler 400 reciprocates and a region in which the support 500 reciprocates. In another aspect, the coupler 400 may move more than the support 500 by the vertical level difference L.

In order to further utilize a region corresponding to the vertical level difference L, the lower end of the coupler 400 may be disposed further lower than the lower end of the support 500 by the vertical level difference L at most. In addition, the upper end of the coupler 400 may be disposed lower than the upper end of the support 500 by the vertical level difference L at most.

Installation vertical levels of the coupler 400 and the support 500 may be set to be different from each other.

As a result, the thickness difference between the support bearing 352 and the driving bearing 362 may be overcome by making the region in which the coupler 400 moves and the region in which the support 500 moves differently.

In a state in which the support 500 has descended, the coupler 400 may separate the driving shaft 130 and the connection housing 310 from each other.

In this connection, the coupler 400 may descend to the driving bearing 362. However, when the coupler 400 is able to separate the driving shaft 130 and the connection housing 310 from each other, the coupler 400 may be disposed to be spaced apart from the driving bearing 362.

In this case, even when the driving shaft 130 rotates, the housing 300 is not rotated by the driving shaft 130, but only the gear assembly 340 is rotated, so that the rotation shaft 200 and the pulsator 40 rotate.

Accordingly, a washing operation, a rinsing operation, and the like other than a dehydration operation may be performed.

Referring to (b) in FIG. 4, when the moving portion 600 rotates or ascends in a direction I, the support 500 ascends along a height direction or a length direction of the connection housing 310 in a direction II.

Accordingly, the coupler 400 may ascend along the longitudinal direction of the shaft body 131 in a direction III, and connect the driving shaft 130 and the connection housing 330 to each other.

The coupler 400 may ascend up to the shaft bearing 361, and the restoring portion 800 may be compressed by the support 500.

Accordingly, the housing 300 may rotate at the same rpm as the driving shaft 130, and the drum 30 coupled to the housing 300 may also rotate in the same manner as the driving shaft 130. In this connection, because the carrier 344 also rotates integrally with the driving shaft 130, the pulsator 40 may also rotate in the same manner as the driving shaft 130.

As a result, the drum 30 and the pulsator 40 may rotate integrally to perform the washing operation, the rinsing operation, and the like including the dehydration cycle.

FIG. 5 shows one embodiment of the clutch C of the present disclosure.

The clutch C of the present disclosure may include the driving shaft 130 rotating by the rotor 120 and transmitting the power to the pulsator 40 or the drum 30, the connection housing 310 accommodating the driving shaft 130 therein, the coupler 400 accommodated in the connection housing 310 and selectively connecting the driving shaft 130 and the connection housing 310 to each other, the support 500 for lifting and lowering the coupler 400, the moving portion 600 that transmits the power generated by the actuator 700 to the support 500, and the restoring portion 800 that restores the position of the coupler 400 by pushing the support 500.

The driving shaft 130 may include the first distal end 132 disposed on top of the shaft body 131 and to which the sun gear 341 may be coupled or formed, and the second distal end 133 coupled to the rotor 120 or forming the lower end of the shaft body 131, and may include a power transmitting portion 134 disposed between the first distal end 132 and the second distal end 133 and to which the coupler 400 may be coupled.

The power transmitting portion 134 may be disposed only at a specific vertical level of the shaft body 131, and may include a serration disposed along an outer circumferential surface of the shaft body 131. Accordingly, the coupler 400 may be coupled to the power transmitting portion 134 only when the coupler 400 is disposed to overlap the power transmitting portion 134 while ascending and descending along the shaft body 131.

The power transmitting portion 134 may further include a power serration capable of being coupled to the coupler 400 on an outer circumferential surface thereof. The power serration may be formed in a shape of a gear tooth or a screw thread.

The connection housing 310 may include a shaft housing 311 accommodating the driving shaft 130 therein and reciprocally accommodating the coupler 400 therein, and a coupling body 312 extending from an upper end of the shaft housing 311 and coupled to the gear housing 320.

The shaft housing 311 may have a larger diameter than the shaft body 131. In addition, the shaft housing 311 may further include a through-hole 3131 defined to connect the coupler 400 and the support 500 to each other. The through-hole 3131 may have a predetermined length along the height direction of the shaft housing 311. The predetermined length may correspond to a moving length of the coupler 400. Accordingly, the through-hole 3131 may limit the moving length of the coupler 400. In one example, the through-hole 3131 may have a length greater than the moving length of the coupler 400.

The coupling body 312 may be disposed on top of the shaft housing 311 to have a larger diameter than the shaft housing 311. The coupling body 312 may be coupled to the gear housing 320, and may form a bottom surface of the gear housing 320 to block the gear assembly 340 from being exposed to the outside of the housing 300.

The coupling body 312 may further include a coupling step 3122 coupled to the gear housing 320 by a fastening member, welding, or the like. The coupling step 3122 may have a larger diameter than the coupling body 312 to provide a space through which the fastening member or the like passes to be coupled.

The restoring portion 800 may accommodate the shaft housing 311 therein, and may be disposed outside the shaft housing 311. The restoring portion 800 may be formed as a spring.

The shaft housing 311 may further include a seating groove 3121 in which one end of the restoring portion 800 may be accommodated and supported at the lower end of the coupling body 312.

The seating groove 3121 may be defined as a bottom surface of the coupling body 312 is recessed from the outer circumferential surface of the shaft housing 311.

One end of the restoring portion 800 may be supported by the seating groove 3121, and the other end thereof may be accommodated in or supported by the support 500.

Because the support 500 is disposed outside the connection housing 310 and the coupler 400 is disposed inside the connection housing 310, the support 500 may include an insertion body 520 capable of moving the coupler 400 through the connection housing 310.

As a result, even when the restoring portion 800 is compressed and expanded repeatedly, the restoring portion 800 may be prevented from deviating from the housing 300 or from being misaligned.

The restoring portion 800 may have a length that allows the restoring portion 800 to be seated in a support body 510 in the seating groove 3121. Even when the support body 510 is located at a bottom dead point (a lowermost end), the restoring portion 800 may have a length for pressing the support body 510 (see FIG. 4).

When the support body 510 is omitted from the support 500, the restoring portion 800 may be seated on a top surface of the insertion body 520 and directly press the insertion body 520. The restoring portion 800 may press the insertion body 520 exposed to the outside of the housing 300.

In one example, the restoring portion 800 may be disposed inside the shaft housing 311 to push the coupler 400.

Hereinafter, in order to describe the complicated components of the clutch C, the simple structure of the restoring portion 800 will be omitted. However, the restoring portion 800 is not omitted from the clutch C.

The coupler 400 may accommodate the shaft body 131 therein, and may reciprocate by the support 500 along the longitudinal direction of the shaft body 131.

The insertion body 520 may not only support a load of the coupler 400, but also move the coupler 400.

The insertion body 520 may be inserted into the through-hole 3131, and may include a plurality of insertion bodies to support one side surface and the other side surface of the coupler 400. Accordingly, the insertion body 520 may prevent the coupler 400 from being inclined when lifting and lowering the coupler 400.

The restoring portion 800 may be seated on the insertion body 520 to restore the position of the insertion body 520. That is, the restoring portion 800 may be seated on top of the plurality of insertion bodies 520 to push the insertion bodies 520.

The through-hole 3131 may allow the insertion body 520 to move along the longitudinal direction of the shaft body 131.

The support 500 may further include a support body 510 fixing both ends of the insertion body 520 and disposed on an outer circumferential surface of the shaft housing 311.

The support body 510 may accommodate the shaft housing 311 therein, and the insertion body 520 may be fitted into the support body 510.

The support body 510 may accommodate the outer circumferential surface of the connection housing 310 therein, and may reciprocate along the height direction of the connection housing 310.

When the support body 510 ascends, the insertion body 520 may also ascend together with the support body 510. Accordingly, by lifting and lowering the support body 510, it is possible to simultaneously lift the plurality of insertion bodies 520.

The restoring portion 800 may be seated in the support body 510 to restore the position of the support body 510, thereby indirectly restoring positions of the plurality of insertion bodies 520.

The restoring portion 800 may push the support body 510, thereby indirectly pushing the insertion body 520.

The moving portion 600 may be connected to the actuator 700 to move the support 500 in the longitudinal direction of the shaft body 131.

The moving portion 600 may include an ascending and descending portion 620 that supports the lower end of the moving portion, and a connection portion 610 having one end coupled to the support and the other end coupled to the actuator to transmit the power of the actuator to the support.

The moving portion 600 may further include a link 630 fixed to the tub 20 or the cover 900 to rotate the ascending and descending portion 620 upwards or downwards. Accordingly, the ascending and descending portion 620 itself may not ascend and descend, but may simply rotate with respect to the link 630. As a result, there is no need to separately secure a space for the moving portion 600 to reciprocate vertically, so that the space occupied by the entire moving portion 600 may be reduced.

The ascending and descending portion 620 may support the support body 510, and may lift the support body 510 to move the insertion body 520.

FIG. 6 shows a detailed structure of the clutch C of the present disclosure.

(a) in FIG. 6 shows a cross-sectional view of the connection housing 310.

The connection housing 310 may include the shaft housing 311 that may accommodate the coupler 400 and the driving shaft 130 therein, and the coupling body 312 extending from one end of the shaft housing 311 to shield the gearbox 340.

The coupling body 312 may have a diameter much larger than the diameter of the shaft housing 311 to fully support or shield the gearbox 340.

The shaft housing 311 may be formed in a pipe shape, so that a space or a hollow in which the driving shaft 130 and the coupler 400 are accommodated may be defined therein. A diameter of an inner circumferential surface of the shaft housing 311 may be larger than a diameter of the driving shaft 130, and may correspond to a diameter of an outer circumferential surface of the coupler 400.

A first space 314 in which the shaft bearing 351 may be installed may be defined at an inner upper end of the shaft housing 311, and a second space 315 in which the driving bearing 352 may be installed may be defined at an inner lower end of the shaft housing 311.

A coupling transmitting portion 313 that may be coupled to the coupler 400 may be disposed on the inner circumferential surface of the shaft housing 311. The coupling transmitting portion 313 may be engaged with the outer circumferential surface of the coupler 400 to prevent the coupler 400 from rotating independently of the shaft housing 311.

The coupling transmitting portion 313 may be formed in a shape of a gear tooth, a serration, a sawtooth, a concave-convex, or the like extending along the longitudinal direction of the shaft housing 311. Accordingly, the movement of the coupler 400 along the longitudinal direction of the shaft housing 311 may not be limited. Rather, the coupler 400 may be guided to move along the longitudinal direction of the shaft housing 311 without arbitrarily rotating.

The shaft housing 311 may have the through-hole 3131 through which the support 500 supporting the coupler 400 may pass. The support 500 may support the coupler 400 by passing through the shaft housing 311 through the through-hole 3131 even when being disposed outside the shaft housing 311.

The through-hole 3131 may extend in the longitudinal direction of the shaft housing 311 or the driving shaft 130 such that the support 500 may move the coupler 400 while ascending and descending.

Hereinafter, the longitudinal direction or the length will be described having a meaning corresponding to the longitudinal direction or the height direction of the driving shaft 130.

That is, the through-hole 3131 may have a width greater than the diameter of the support 500, and may have a length greater than the diameter of the support 500 along the longitudinal direction of the shaft housing 311.

The through-hole 3131 may be defined in a direction parallel to the diameter of the shaft housing 311, and may be defined inwardly of a tangent to the inner circumferential surface of the shaft housing 311. Accordingly, the coupler 400 and the coupling transmitting portion 313 may be exposed to the outside through the through-hole 3131.

The through-hole 3131 may be defined by passing through one surface and the other surface of the shaft housing 311 in a parallel manner.

In addition, the through-hole 3131 may include a plurality of through-holes, and the plurality of through-holes 3131 may be defined in parallel with each other. A spacing between the plurality of through-holes 3131 may correspond to a diameter of a coupler body 410.

Accordingly, both surfaces of the coupler body 410 may be exposed through the plurality of through-holes 3131.

Accordingly, even when the support 500 is disposed outside the housing 300, the support 500 may be inserted into the through-hole 3131 to support the coupler 400.

The coupling transmitting portion 313 may be disposed in a region corresponding to an inner circumferential surface of the through-hole 3131. Therefore, even when the support 500 reciprocates between an upper end of the through-hole 3131 and a lower end of the through-hole 3131, the coupler 400 may always be engaged with the coupling transmitting portion 313.

Furthermore, the coupling transmitting portion 313 may further extend from the upper end of the through-hole 3131 toward the coupling body 312, and may further extend from the lower end of the through-hole 3131 toward the lower end of the shaft housing 311.

Accordingly, even when the upper end of the coupler 400 moves above the upper end of the through-hole 3131 or the lower end of the coupler 400 moves below the lower end of the through-hole 3131, the coupler 400 may always be engaged with the coupling transmitting portion 313.

In addition, an entirety of the coupling transmitting portion 313 may extend from the first space 314 to the second space 315. Accordingly, the coupler 400 may always be engaged with the coupling transmitting portion 313 inside the housing 300. As a result, when the coupler 400 is engaged with the driving shaft 130 to receive the power and rotate, the coupler 400 may be engaged with the coupling transmitting portion 313 to rotate the entire housing 300.

In one example, a bearing support surface 3112 to which the external bearing 350 may be coupled may be further disposed at a lower end of an outer circumferential surface of the shaft housing 311. The bearing support surface 3112 may have a thickness smaller than that of the shaft housing 311 to provide a space to be seated on the support bearing 352.

At least a portion of the bearing support surface 3112 may overlap the second space 315. Because the support bearing 352 is thicker or larger than the driving bearing 362, the bearing support surface 3112 may be longer than the second space 315.

Specifically, an upper end of the bearing support surface 3112 may be disposed higher than an upper end of the second space 315.

Referring to (b) in FIG. 6, the driving shaft 130 may include the shaft body 131 accommodated in the shaft housing 311, the first distal end 132 disposed at the upper end of the shaft body 131, and the second distal end 133 disposed at the lower end of the shaft body 131.

The length of the shaft body 131 may correspond to the length of the shaft housing 311. The first distal end 132 may be disposed above the coupling body 312.

In addition, the second distal end 133 may be exposed below the shaft housing 311.

The diameter of the shaft body 131 is smaller than the diameter of the inner circumferential surface of the shaft housing 311, so that the outer circumferential surface of the shaft body 131 and the inner circumferential surface of the shaft housing 311 may always be maintained in a state of being spaced apart from each other.

The shaft body 131 may include the power transmitting portion 134 capable of being engaged with the inner circumferential surface of the coupler 400. The power transmitting portion 134 may be formed in the shape of the gear tooth, the serration, the concave-convex, the sawtooth, or the like protruding from the outer circumferential surface of the shaft body 131.

The power transmitting portion 134 may be disposed in parallel along the longitudinal direction of the shaft body 131. Accordingly, the power transmitting portion 134 may guide the coupler 400 to move along the shaft body 131.

In one example, the shaft body 131 may further include a smooth surface 136 that is not engaged with the inner circumferential surface of the coupler 400 at the upper end or the lower end of the power transmitting portion 134. The coupler 400 may not be engaged with the driving shaft 130 when being disposed on the outer circumferential surface of the smooth surface 136, and may be engaged with the driving shaft 130 to rotate together with the driving shaft 130 when being disposed on the outer circumferential surface of the power transmitting portion 134.

The power transmitting portion 134 may be disposed so as not to face the through-hole 3131. That is, the power transmitting portion 134 may be disposed above the upper end of the through-hole 3131 or disposed below the lower end of the through-hole 3131.

Accordingly, when the coupler 400 moves from the upper end to the lower end of the through-hole 3131, the coupler 400 may be selectively coupled to or separated from the power transmitting portion 134.

For example, the power transmitting portion 134 may extend from a location lower than the through-hole 3131 toward the second distal end 133. Both upper and lower portions of the power transmitting portion 134 may be formed as the smooth surface 136.

In this connection, a length of the smooth surface 136 disposed below the power transmitting portion 134 may be smaller than a length of the smooth surface 136 disposed above the power transmitting portion 134.

The power transmitting portion 134 may protrude from the shaft body 131.

In addition, the power transmitting portion 134 may be engraved in the shaft body 131.

The length of the power transmitting portion 134 may be the same as or greater than the length of the coupler 400.

In addition, the length of the power transmitting portion 134 may be smaller than the length of the coupler 400. Accordingly, the coupler 400 may be easily coupled to or separated from the power transmitting portion 134.

Referring to (c) in FIG. 6, the coupler 400 may include the coupler body 410 that may be accommodated in the shaft housing 311 and accommodate the driving shaft 130 therein, an inner coupling portion 430 that may be disposed on an inner circumferential surface of the coupler body 410 and be engaged with the power transmitting portion 134, and a surface coupling portion 420 that may be disposed on the outer circumferential surface of the coupler body 410 and be engaged with the coupling transmitting portion 313.

The inner coupling portion 430 may be formed in a serration or concave-convex shape to be engaged with the power transmitting portion 134, and the surface coupling part 420 may also be formed in a serration or concavo-convex shape to be engaged with the coupling transmitting portion 313.

The inner coupling portion 430 and the surface coupling portion 420 may be disposed in parallel with an axial direction of the coupler body 410.

A diameter of the coupler body 410 may be greater than a diameter of the shaft body 131 and smaller than a diameter of the shaft housing 311. A thickness of the coupler body 410 may correspond to a spacing between the coupling transmitting portion 313 and the power transmitting portion 134.

A diameter of the surface coupling portion 420 may correspond to the diameter of the coupling transmitting portion 313, and the diameter of the inner coupling portion 430 may correspond to the diameter of the power transmitting portion 134.

When the coupler body 410 ascends and descends and the inner coupling portion 430 is coupled to the power transmitting portion 134, the coupler body 410 may rotate together with the driving shaft 130.

Accordingly, because the coupler 400 is disposed between the power transmitting portion 134 and the coupling transmitting portion 313, the inner coupling portion 430 may be coupled to the power transmitting portion 134, and the surface coupling portion 420 may be coupled to the coupling transmitting portion 313. As a result, the power of the driving shaft 130 may be directly transmitted to the housing 300.

In addition, when the coupler 400 is spaced apart from the power transmitting portion 134 and disposed on the smooth surface 136, the inner coupling portion 430 is separated from the power transmitting portion 134. Accordingly, the shaft body 131 may rotate independently of the coupler 400, and the coupler 400 may be prevented from rotating because the coupler 400 is engaged with the coupling transmitting portion 313. As a result, the power of the driving shaft 130 may be blocked from being transmitted to the housing 300.

As described above, the coupling transmitting portion 313 may be disposed in a region the same as or greater than the region in which the coupler 400 may move along the longitudinal direction of the shaft housing 311.

The surface coupling portion 420 may always remain coupled to the coupling transmitting portion 313. Even when the coupler 400 moves along the shaft housing 311, the coupler 400 may be supported by the coupling transmitting portion 313 to prevent the coupler body 410 from being inclined.

Accordingly, when the coupler 400 is engaged with the power transmitting portion 134, the power of the driving shaft 130 may be transmitted to the housing 300 through the coupling transmitting portion 313 immediately.

In addition, when the coupler 400 deviates from the power transmitting portion 134, the shaft body 131 may freely rotate inside the inner coupling portion 430. Accordingly, the coupler 400 may be fixed to the shaft housing 310 and only the driving shaft 130 may rotate, so that the power of the driving shaft 130 may be blocked from being transmitted to the housing 300.

The power transmitting portion 134 may be located at a position at which the coupler 400 is disposed when the support 500 is lowered by the moving portion 600.

In addition, the length of the power transmitting portion 134 may be determined as a length that allows the power transmitting portion 134 to be separated from the coupler 400 when the support 500 is lowered by the restoring portion 800.

In one example, the coupler 400 may further include a support accommodating portion 440 on which the support 500 may be seated. The support accommodating portion 440 may be constructed such that the surface coupling portion 420 is recessed to allow at least a portion of the support 500 to be seated thereon.

In addition, the support accommodating portion 440 may be disposed to be biased toward an upper end of the coupler body 410. Accordingly, the coupler body 410 may descend below the lower end of the through-hole 3131.

The coupler body 410 may be disposed below the insertion body 520 by a length corresponding to the vertical level difference L. The coupler body 410 may descend further downwards without being limited by the support bearing 352.

The support accommodating portion 440 may be formed in a slit shape into which the insertion body 520 may be inserted along an outer circumferential surface of the coupler body 410. Therefore, even when the coupler 400 rotates, the coupler 400 may be continuously supported by the support 500 that does not rotate.

FIG. 7 shows a coupling relationship between the coupler 400 and the driving shaft 130.

Referring to (a) in FIG. 7, the coupler body 410 may accommodate the driving shaft 130 therein. When the support 500 ascends and the coupler body 410 ascends along the longitudinal direction of the driving shaft 130, the inner coupling portion 430 may be disposed to face the smooth surface 136 and may be separated from the power transmitting portion 134.

Accordingly, even when the driving shaft 130 rotates, because the smooth surface 136 is not engaged with the coupler body 410, the coupler 400 may not rotate.

The lower end of the coupler body 410 may ascend to be disposed above the upper end of the power transmitting portion 134. Accordingly, it may be ensured that the inner coupling portion 430 is separated from the power transmitting portion 134.

Accordingly, the pulsator 40 may rotate together with the rotor 120, and the drum 30 may not rotate together with the pulsator 40.

Referring to (b) in FIG. 7, the support 500 may descend, and thus, the coupler body 410 may descend along the longitudinal direction of the driving shaft 130. The inner coupling portion 430 may be engaged with the power transmitting portion 134.

The coupler body 410 may descend to accommodate the power transmitting portion 134 therein, and the inner coupling portion 430 may be completely engaged with the power transmitting portion 134.

When the engagement of the inner coupling portion 430 with the power transmitting portion 134 is completed, the driving shaft 130 and the coupler 400 may be coupled to each other. Accordingly, when the driving shaft 130 rotates, the coupler 400 may rotate together with the driving shaft 130.

Accordingly, the coupler 400 may transmit the rotational force of the driving shaft 130 to the housing 300, and the housing 300 may rotate together with the driving shaft 130.

As a result, the drum 30 and the pulsator 40 may rotate together.

Unlike as shown in the drawing, the installation position of the power transmitting portion 134 may be changed, so that the coupler 400 may be engaged with the power transmitting portion 134 when the coupler 400 ascends, and may be separated from the power transmitting portion 134 when the coupler 400 descends.

FIG. 8 shows a coupling relationship between the coupler 400 and the housing 300.

Referring to (a) in FIG. 8, when the support 500 is lifted by the moving portion 600, the insertion body 520 may lift the coupler 400. The insertion body 520 may ascend to the upper end of the through-hole 3131 to maximally lift the coupler 400.

Referring to (b) in FIG. 8, when the support 500 is lowered by the moving portion 600, the insertion body 520 may lower the coupler 400. The insertion body 520 may descend to the lower end of the through-hole 3131 to maximally lower the coupler 400.

The coupler 400 is disposed to reciprocate inside the shaft housing 311 by a reciprocating length of the support 500. Accordingly, the coupler 400 may reciprocate by the length of the through-hole 3131.

As such, the coupler 400 may always be maintained in the state of being engaged with the coupling transmitting portion 313 even when ascending and descending inside the shaft housing 311.

The coupler 400 may be repeatedly engaged with and separated from the power transmitting portion 134 while ascending and descending inside the shaft housing 311.

The through-hole 3131 may correspond to one side and the other side of the coupler 400.

As a result, the insertion body 520 may support both surfaces of the coupler 400, thereby preventing the coupler 400 from being inclined.

The insertion body 520 may include a first insertion body 521 inserted into one of the through-holes 3131 to support one surface of the coupler 400, and a second insertion body 522 inserted into another of the through-holes 3131 to support the other surface of the coupler 400.

The first insertion body 521 and the second insertion body 522 may have the same shape.

FIG. 9 shows an embodiment in which the support capable of moving the coupler 400 is coupled to the housing 300.

The support 500 may include the insertion body 520 inserted into the through-hole 3131 of the housing 300.

Because the through-hole 3131 includes the plurality of through-holes 3131, the insertion body 520 may also include a plurality of insertion bodies 520.

The insertion body 520 may be formed in a rod or pipe shape.

A diameter of the insertion body 520 may be smaller than a thickness of the through-hole 3131.

Therefore, the insertion body 520 may be easily inserted into the through-hole 3131 to be seated on the support accommodating portion 440 of the coupler 400.

The insertion body 520 may include an insertion pipe 5212 inserted into the through-hole 3131 to support the support accommodating portion 440 of the coupler 400. The insertion pipe 5212 may be formed in a straight line shape.

Both ends of the insertion pipe 5212 may be exposed to the outside of the housing 300 and a central portion of the insertion pipe 5212 may be disposed inside the shaft housing 311 to be seated on the support accommodating portion 440.

Both ends of the insertion pipe 5212 may ascend and descend by being supported by the moving portion 600 or the like disposed outside the housing 300, and the coupler 400 may ascend and descend by being supported by the central portion of the insertion pipe 5212 inserted into the housing 300.

Accordingly, even when the coupler 400 is disposed inside the housing 300, it is possible to lift and lower the coupler 400 to the moving portion 600 disposed outside the housing 300.

The insertion body 520 may further include a body support pipe 5211 that extends by being bent at each of both ends of the insertion pipe 5212 at a certain angle. The body support pipe 5211 may expand a contact area between the insertion body 520 and the separate support 500 or moving portion 600 disposed outside the housing 300.

FIG. 9 shows that only one insertion body 520 is disposed, but the plurality of insertion bodies 520 may be disposed.

A spacing between the insertion pipe 5212 of the first insertion body 521 and the insertion pipe 5222 of the second insertion body 522 may correspond to a diameter of the support accommodating portion 440.

The spacing between the insertion pipe 5212 of the first insertion body 521 and the insertion pipe 5222 of the second insertion body 522 may be smaller than the diameter of the surface coupling portion 420 and greater than the diameter of the inner coupling portion 430.

The insertion pipe 5212 of the first insertion body 521 and the insertion pipe insertion pipe 5222 of the second insertion body 522 may be arranged side in parallel to each other to prevent the coupler 400 from being increased while ascending and descending.

The insertion pipe 5212 of the first insertion body 521 may be seated on the support accommodating portion 440 facing one surface of the coupling transmitting portion 313, and the insertion pipe 5222 of the second insertion body may be seated on the support accommodating portion 440 facing the other surface of the coupling transmitting portion 313.

In one example, the insertion body 520 may be directly supported by the moving portion 600 to ascend and descend.

However, the diameter of the insertion body 520 is relatively small. In addition, because the insertion bodies 520 are arranged to be spaced apart from each other by a certain distance, the plurality of insertion bodies 520 need to ascend or descend by the same height at the same time.

To this end, the support 500 may further include the support body 510 for supporting the insertion body 520.

The support body 510 may be disposed on the outer circumferential surface of the shaft housing 310 to support at least one of both ends of the insertion body 520.

The support body 510 may be coupled to all of the plurality of insertion bodies 520 to lift and lower the plurality of insertion bodies 520 by the same height.

The support body 510 may ascend or descend to the moving portion 600 to simultaneously lift and lower the plurality of insertion bodies 520.

The support body 510 may include an ascending and descending body 511 formed in a ring shape to accommodate the outer circumferential surface of the shaft housing 310 therein.

The ascending and descending body 511 may include a groove 5111 for lifting and lowering into which the insertion body 520 is inserted and supported.

In addition, the support body 510 may further include a seating body 512 that may extend to have a diameter larger than that of the ascending and descending body 511 and be supported by the moving portion 600.

FIG. 10 shows an exploded perspective view of the support 500.

The support body 510 may be formed in a cylindrical shape accommodating the shaft housing 310 therein. The support body 510 may be reciprocally movable along the longitudinal direction of the shaft housing 310.

The support body 510 may include the ascending and descending body 511 that may surround the outer circumferential surface of the shaft housing 310 and fix the insertion body 520, and a through-hole 514 defined to pass through the ascending and descending body 511 such that the shaft housing 310 may pass therethrough.

The ascending and descending body 511 may have the groove 5111 for lifting and lowering into which the insertion body 520 may be inserted and fixed. The groove 5111 for lifting and lowering may be defined as a hole penetrating the ascending and descending body 511, or may be defined as a groove recessed from the outer circumferential surface of the ascending and descending body 511. When the insertion body 520 includes the body support pipe 5211, the groove 5111 for lifting and lowering may be defined in a shape of a slit into which the body support pipe 5211 may be seated. A thickness of the ascending and descending body 511 may be much larger than the diameter of the insertion body 520. Accordingly, the insertion body 520 may be stably supported.

The support body 510 may further include the seating body 512 supported by the moving portion 600 to receive the power of the actuator 700 from the moving portion 600. The seating body 512 may be extended to be stepped from the upper end of the ascending and descending body 511 to secure an area in which the moving portion 600 may be supported.

An accommodating groove 513 into which the restoring portion 800 may be partially accommodated and seated may be defined at the upper end of the support body 510. The accommodating groove 513 may be recessed from the top surface of the support body 510, and may be defined between the outer circumferential surface of the through-hole 514 and the inner circumferential surface of the seating body 512. The accommodating groove 513 may be defined to correspond to the diameter of the restoring portion 800, and may have a depth at which a portion of the restoring portion 800 may be accommodated and fixed in the support body 510.

Therefore, even when the support body 510 reciprocates, it is possible to prevent the restoring portion 800 from deviating from the support body 510 or prevent the installed position of the restoring portion 800 from changing.

In one example, because the insertion body 520 must pass through the groove 5111 for lifting and lowering and be inserted into the through-hole 3131, the support body 511 should be disposed such that the groove 5111 for lifting and lowering faces the through-hole 3131.

In addition, the through-hole 3131 includes the plurality of through-hole 3131 in the shaft housing 311, and the insertion body 520 also includes the plurality of insertion bodies 520 so as to be inserted into all of the through-holes 3131. Therefore, in order to easily fasten the insertion body 520 to the support body 510 and the housing 300, the groove 5111 for lifting and lowering and the through-hole 3131 need to be aligned in position.

Because the shaft housing 311 is formed in a cylindrical shape, and the through-hole 514 of the support body 510 is also formed in a circular shape, even when the through-hole 3131 and the groove 5111 for lifting and lowering are temporarily aligned in position, there may be inconvenience of aligning the through-hole 3131 and the groove 5111 for lifting and lowering in position again when the support body 510 rotates arbitrarily.

To improve this, the support body 510 may include a determining portion 515 protruding from or inserted into the inner circumferential surface of the through-hole 514.

An installation guide 3111 protruding from or inserted into the outer circumferential surface so as to accommodate the determining portion 515 therein or to be accommodated in the determining portion 515 may be formed on a surface of the shaft housing 311.

When the determining portion 515 protrudes from the inner circumferential surface of the support body 510, the installation guide 3111 may be recessed by a predetermined depth from the shaft housing 311 such that the determining portion 515 is accommodated therein.

The installation guide 3111 may be defined along the longitudinal direction of the shaft housing 311. Accordingly, the determining portion 515 may be guided along the installation guide 3111 to ascend and descend.

When the determining portion 515 is coupled to the installation guide 3111, the determining portion 515 may be disposed to face the groove for lifting and lowering 3111 and the through-hole 3131.

When being coupled with the installation guide 3111, the determining portion 515 may be movable along the longitudinal direction of the shaft housing 311, but may be blocked from rotating or being misaligned.

A thickness of the determining portion 515 may correspond to a width of the installation guide 3111, so that the determining portion 515 may be prevented from shaking or vibrating inside the installation guide 3111.

The support body 520 may be made of a resin or the like to minimize a frictional force with the shaft housing 310. The insertion body 520 may pass through the groove 5111 for lifting and lowering and the through-hole 3131 to be at least partially seated on the support accommodating portion 440.

In one example, the support body 520 may rotate together when the housing 300 rotates.

FIG. 11 shows an aspect in which the support 500 ascends and descends from the housing 300.

Referring to (a) in FIG. 11, the first insertion body 521 and the second insertion body 522 may be respectively inserted into the plurality of through-holes 3131 to support the outer circumferential surface of the coupler 400 accommodated in the shaft housing 310.

The first insertion body 521 and the second insertion body 522 may be respectively positioned at lower ends of the through-holes 3131 to lower the coupler 400. In addition, the restoring portion 800 may also be in a state of pushing the support body 510 downwards.

The support body 510 may accommodate the outer circumferential surface of the shaft housing 310 therein, and may be coupled to at least one of both ends of the first insertion body 521 and the second insertion body 522 to support the first insertion body 521 and the second insertion body 522.

The first insertion body 521 and the second insertion body 522 may be disposed and supported at the same vertical level in the support body 510.

Referring to (b) in FIG. 11, the support body 510 may be lifted by the moving portion 600.

The ascending and descending body 511 may ascend while pressing the restoring portion 800. The ascending and descending body 511 may ascend and descend without being inclined to one side as a diameter of the through-hole 514 corresponds to a diameter of the outer circumferential surface of the shaft housing 311 and the determining portion 515 is guided to the installation guide 3111.

Accordingly, even when the first insertion body 521 and the second insertion body 522 are disposed to be spaced apart from each other, the first insertion body 521 and the second insertion body 522 may be supported by the ascending and descending body 511 to ascend.

Accordingly, the coupler 400 supported by the first insertion body 521 and the second insertion body 522 through the support accommodating portion 440 may ascend inside the shaft housing 311.

The coupler 400 may be separated from the power transmitting portion 134 to block the power of the driving shaft 130 from being transmitted to the housing 300.

In one example, when the moving portion 600 lowers the support body 510, the ascending and descending body 511 descends without being inclined to return to the state shown in (a) in FIG. 11.

The restoring portion 800 may push the support body 510 to induce the support body 510 to descend more quickly.

The coupler 400 may be more rapidly coupled to the power transmitting portion 134 to transmit the power of the driving shaft 130 to the housing 300.

FIG. 12 shows one embodiment of the moving portion 600.

The moving portion 600 may be disposed outside the housing 300 to lift and lower the support 500.

The moving portion 600 may be connected to the actuator 700 to receive the power. The moving portion 600 may lift and lower the support 500 in a form of a lever or a seesaw.

The moving portion 600 may include the ascending and descending portion 620 disposed to support the support body 510, and the link 630 rotatably supporting the ascending and descending portion 620.

The ascending and descending portion 620 may be disposed to support a bottom surface of the seating body 512. The ascending and descending portion 620 may lift or lower the seating body 512 while rotating with respect to the link 630.

The link 630 may be supported by being coupled to the interior of the clutch cover 900.

The first space 314 may be inclinedly recessed from the coupling body 312.

The determining portion 515 may ascend and descend along the installation guide 3111 when the support body 510 ascends and descends by the ascending and descending portion 620.

One end of the ascending and descending portion 620 may be located lower than the link 630, and the other end or a free end thereof may be located lower than the link 630.

The ascending and descending portion 620 may extend from the link 630 to the determining portion 515 or the installation guide 3111. The free end of the ascending and descending portion 620 may shield at least a portion of the groove 5111 for lifting and lowering. Accordingly, it is possible to prevent the insertion body 520 from deviating from the support body 510.

The moving portion 600 may be fixed inside the clutch cover 900 and prevented from rotating.

Accordingly, the ascending and descending portion 620 may support the seating body 512 such that the seating body 512 slides and rotates on a top surface of the ascending and descending portion 620.

FIG. 13 shows a structure in which a rotating portion 640 supports the support 600 and the coupler 400 by omitting the housing 300 from the clutch C.

Referring to (a) in FIG. 13, the insertion body 520 may support the support accommodating portion 440 of the coupler 400 by being inserted into the support body 510.

The support body 510 may include a hole 5112 for lifting and lowering into which the insertion body 520 may be inserted and through which the insertion body 520 may pass. The hole 5112 for lifting and lowering may support both ends of the insertion body 520 as well as accommodate therein the insertion body 520 inserted thereinto.

The insertion body 520 may be inserted into the hole 5112 for lifting and lowering to be seated on the coupler 400, and inserted into a hole 5112 for lifting and lowering on an opposite side to be supported.

That is, the holes 5112 for lifting and lowering may be defined in the support body 510 to face each other based on the through-hole 514.

The hole 5112 for lifting and lowering may be defined to avoid the determining portion 515, and may be defined to be spaced apart from both surfaces of the determining portion 515.

In one example, the accommodating groove 513 is defined by being recessed in a ring shape from the top surface of the support body 510. Accordingly, it is possible to provide a space in which the restoring portion 800 may be seated. The restoring portion 800 may be formed as a spring having a diameter corresponding to a diameter of the accommodating groove 513.

The ascending and descending portion 620 may be rotatably coupled to the link 630 through a rotation pin 631. The ascending and descending portion 620 may support the seating body 512 with the free end thereof, the central portion thereof may be coupled to the link 630, and one end thereof may be connected to the actuator 700.

The ascending and descending portion 620 may include a rotation link 621 rotatably coupled to the link 630, a gripping arm 622 extending from the rotation link 621 to the support body 620, and an action arm 623 extending opposite to the gripping arm 622 from the rotation link 621 to receive the power from the actuator 700.

The gripping arm 622 may be branched to both sides from the rotation link 621 to support both surfaces of the seating body 512. A spacing between branched portions of the gripping arm 622 may be the same as or slightly larger than the diameter of the ascending and descending body 510, and may be smaller than the diameter of the outer circumferential surface of the seating body 512.

The gripping arm 622 may rotatably support the support body 510.

The gripping arm 622 may extend from the rotation link 621 to a region facing a region in which the coupler 400 is disposed.

The gripping arm 622 may extend from the rotation link 621 at an angle smaller than 180 degrees from the action arm 623. The action arm 623 may be disposed above the rotation link 621, and the gripping arm 622 may be disposed below the rotation link 621.

Accordingly, when the action arm 623 rotates outwardly with respect to the link 630, the gripping arm 622 may ascend.

When the ascending and descending body 510 reaches the bottom dead point (the lowest position), it may be disposed to be parallel to the ground. The action arm 623 may be disposed to form an acute angle with the driving shaft 130.

The link 630 may further include a link plate 632 formed in a plate shape to support a load of the ascending and descending portion 600, and a support link 633 extending from both ends of one surface of the link plate 632 and to which the rotation pin 631 is rotatably coupled.

Referring to (b) in FIG. 13, the gripping arm 622 may further include a contact protrusion that may protrude from a top surface thereof to be in contact with the seating body 512.

Accordingly, it is possible to minimize a frictional force applied by the gripping arm 622 to the seating body 512 by minimizing a contact area between the gripping arm 622 and the seating body 512.

In addition, the seating body 512 may improve a contact force between the gripping arm 622 and the seating body 512.

In one example, the support body 510 may have the groove 5111 for lifting and lowering capable of supporting the insertion body 520 outwardly of the hole 5112 for lifting and lowering.

The groove 5111 for lifting and lowering may be defined in a slit shape, so that the hole 5112 for lifting and lowering may be defined therein.

The holes 5112 for lifting and lowering may be defined at both ends of the accommodating groove 5111, respectively.

The body support pipe 5211 may be seated in the accommodating groove 5111, and the insertion pipe 5212 may be inserted into the hole 5112 for lifting and lowering.

In one example, only the hole 5112 for lifting and lowering may be defined and the accommodating groove 5111 may be omitted.

The insertion pipe 5212 may pass through the support body 510 to support one surface of the coupler 400 located inside the housing 300.

The support accommodating portion 440 may be defined as a groove in which the insertion pipe 5212 may be seated, and a separate serration may be omitted. The support accommodating portion 440 may be disposed along the circumference of the coupler body 410 to continuously maintain a state of being seated on the insertion pipe 5212 even when the coupler 400 rotates.

When the coupler 400 is seated on the insertion body 520, a bottom surface of the coupler 400 may be located further below a bottom surface of the support body 510.

Accordingly, the coupler 400 may reciprocate at a location further lower than a location of the support 500. As a result, a reciprocating region of the support 500 and a reciprocating region of the coupler 400 may be set differently.

FIG. 14 is a cross-sectional view of the clutch C.

The coupler 400 may be disposed inside the shaft housing 311.

The coupling body 312 may be disposed on top of the shaft housing 311 to limit an ascending region of the support 500.

The support 500 may include the insertion body 520 penetrating the housing 300 from the outside of the housing 300, and the support body 510 for supporting the insertion body 520 from the outside of the housing 300.

Accordingly, the support 500 may support and lift the coupler 400 from the outside of the housing 300 even when the coupler 400 is accommodated in the housing 300.

The insertion body 520 may be inserted into the through-hole 313 to support the coupler 400.

The plurality of through-holes 313 may be defined through the shaft housing 311. A diameter of an inner circumferential surface of the through-hole 313 may correspond to a diameter of an inner circumferential surface of the shaft housing 311. Accordingly, the coupler 400 may be exposed to the inner surface of the through-hole 313 to be in contact with the insertion body 520.

By the rotation of the moving portion 600, the support 500 may lift and lower the coupler while ascending and descending.

The second distal end 133 of the driving shaft 130 may be coupled to the rotor 120, and the coupler 400 may reciprocate on the outer circumferential surface of the shaft body 131.

A spacing between the outer circumferential surface of the shaft body 131 and the inner circumferential surface of the shaft housing 311 may correspond to a thickness of the coupler 400.

The power transmitting portion 134 may be located below the through-hole 313.

In addition, when the coupler 400 is positioned at the upper end of the through-hole 313, the coupler 400 may have a length that allows the coupler 400 to be separated from the power transmitting portion 134.

The link 630 may be disposed between a lower portion of the coupling body 312 and an upper portion of the bearing support surface 3112. An upper end of the ascending and descending portion 620 may be located above the coupling body 621, and a lower end of the ascending and descending portion 620 may be located below the coupling body 621.

FIG. 15 shows an aspect in which the support 500 and the coupler 400 move through the moving portion 600.

Referring to (a) in FIG. 15, the power transmitting portion 134 may be located further lower than the lower end of the through-hole 313. When the lower end of the power transmitting portion 134 is supported by the driving bearing 362, the upper end of the power transmitting portion 134 may have a thickness or a length so as not to be exposed to lower portion of the through-hole 3131.

The length of the power transmitting portion 134 may be equal to or smaller than a spacing between the upper end of the driving bearing 362 and the upper end of the support bearing 352.

The length of the coupler 400 may be much greater than the length of the power transmitting portion 134, and may be greater than the length of the through-hole 3131.

Accordingly, the coupler 400 may be quickly separated from or coupled to the power transmitting portion 134.

The clutch cover 900 may support the lower end of the shaft housing 311 through the support bearing 352.

The link 630 may be supported by the clutch cover 900 to support the ascending and descending portion 620. When the ascending and descending portion 620 rotates in a direction I by the actuator 700, the support body 510 descends, and thus, the insertion body 520 also descends to the lower end of the through-hole 3131.

The coupler 400 may be coupled to and engaged with the power transmitting portion 134, and may always be engaged with the coupling transmitting portion 313, thereby connecting the driving shaft 130 and the housing 300 to each other.

Accordingly, when the driving shaft 130 rotates, due to the first distal end 132, the gearbox 340 may rotate, so that the pulsator 40 may rotate. At the same time, the coupler 400 may rotate, and thus, the housing 300 may also rotate, so that the drum 30 may also rotate.

Referring to (b) in FIG. 15, when the ascending and descending portion 620 rotates in a direction II, the support body 510 may ascend by the ascending and descending portion 620, and the insertion body 520 may ascend to the upper end of the through-hole 3131. Because the coupler 400 ascends together with the insertion body 520, the coupler 400 may be separated from the power transmitting portion 134 and may face the smooth surface 136.

When the driving shaft 131 rotates, the first distal end rotates 132 may also rotate, so that the pulsator 40 may rotate, but the coupler 400 may not rotate.

Accordingly, the coupler 400 may separate the driving shaft 130 and the housing 300 from each other to prevent the housing 300 from being rotated by the driving shaft 130.

The moving portion 600 may linearly reciprocate the support 500 and the coupler 400 by rotating the ascending and descending body 620 with respect to the link 630.

FIG. 16 shows an embodiment in which the ascending and descending portion 620 may be rotated.

The gripping arm 622 and the action arm 623 may be disposed to be spaced apart from each other at a certain angle to serve as the seesaw or the lever with respect to the rotation link 621.

For example, when the action arm 623 rotates downwards, the gripping arm 622 rotates upwards to lift the support 500.

The gripping arm 622 may branch and extend from the rotation link 621 to support both surfaces of the support body 510. That is, a width of free ends of a plurality of gripping arms 622 may be greater than a diameter of the shaft housing 310 and a diameter of the support body 510.

In order to increase the contact force with the support 500 and to concentrate the force that lifts the support 500, the gripping arm 622 may further include the contact protrusion 6221 that is formed as a portion facing the ascending and descending body 511 or the seating body 512 protrudes.

In one example, when there is no power generated from the actuator 700, the gripping arm 622 may be disposed below the rotation link 621, and the action arm 623 may be disposed above the gripping arm 622. Accordingly, even when the action arm 623 rotates a little, the gripping arm 622 may rotate upwards more.

The ascending and descending portion 620 may include a coupling portion 624 disposed at the free end of the action arm 623 to be coupled to the connection portion 610. The coupling portion 624 may extend at an angle different from that of the action arm 623. That is, the coupling portion 624 may be disposed in parallel with the gripping arm 622 at a position higher than the rotation link 621, or may extend to be inclined from the action arm 623 below the gripping arm 622.

Accordingly, when the coupling portion 624 is pulled or rotated downwards by the actuator 700, the gripping arm 622 may rotate upwards and lift the rotating portion 640. When the coupling portion 624 rotates upwards, the gripping arm 622 may rotate downwards and lower the rotating portion 640.

The connection portion 610 may include a coupling ring 611 coupled to the actuator 700, an extension 612 extending from the coupling ring 611 toward the coupling portion 624, and an elastic portion 613 disposed at a distal end of the extension 612 and coupled to the coupling portion 624.

The coupling ring 611 may be coupled to the actuator 700 to pull or push the extension 612. In this connection, when the actuator 700 includes a rotating bar rotating at a certain radius, the coupling ring may have a width corresponding to an allowable length T4 so as not to interfere with the rotation of the rotating bar.

The allowable length T4 may be the same as or smaller than a rotation diameter of the rotation bar.

In one example, the coupling portion 624 may extend from the action arm 623 to be inclined downwardly with respect to the gripping arm 622 or the tub bottom surface 22. Accordingly, a larger rotational moment may be generated when the coupling portion 624 is pulled by the actuator 700.

When the actuator 700 also rotates the coupling portion 624, the action arm 623 may also rotate to rotate the gripping arm 622. Conversely, the actuator 700 may be designed to move or rotate the coupling portion 624 by a length or an angle at which the free end of the gripping arm 622 may rotate and ascend.

However, when the actuator 700 is constructed to move or rotate the coupling portion 624 by the length or the angle at which the free end of the gripping arm 622 may ascend, the force or the length of the gripping arm 622 to support or lift the support 500 may be insufficient due to a tolerance or the like. Accordingly, the gripping arm 622 may not ascend to a set vertical level.

In addition, when the length or the angle at which the actuator 700 pulls or rotates the coupling portion 624 is insufficient, there may be a problem that the gripping arm 622 is not able to sufficiently lift the support 500.

In addition, when the actuator 700 moves or rotates the gripping arm 622 only by the length or the angle at which the free end of the gripping arm 622 may rotate and ascend exactly, when the vibration or the like generated in the tub 20 is transmitted to the gripping arm 622 and pushes the gripping arm 622, the gripping arm 622 may descend from the set vertical level, so that it may not be able to support the support 500.

Accordingly, the actuator 700 is preferably constructed to move the coupling portion 624 to ascends by a length or an angle greater than the length or the angle at which the free end of the gripping arm 622 may ascend.

Accordingly, even when being supporting the support 500, the gripping arm 622 may continuously provide a lifting force to the support 500 to prevent the position of the support 500 from varying or prevent the support 500 from arbitrarily descending.

However, when the actuator 700 moves the coupling portion 624 to ascends by the length or the angle greater than the length or the angle at which the free end of the gripping arm 622 may ascend, the gripping arm 622 may be excessively in close contact with the support 500 or press the support 500 too much. Therefore, the gripping arm 622 and the support 500 are rubbed more strongly, so that at least one may be worn. When the vibration of the tub 20 is transmitted to the support 500, at least one of the gripping arm 622 and the support 500 may be damaged.

In addition, when the actuator 700 moves the coupling portion 624 to ascends by the length or the angle greater than the length or the angle at which the free end of the gripping arm 622 may ascend, the actuator 700 may pull the extension 612 excessively, so that there is a risk that at least some of the components of the ascending and descending portion 620 may be damaged or deformed.

Accordingly, the connection portion 610 of the present disclosure may further include the elastic portion 613 extending from the distal end of the extension 612 and coupled to the coupling portion 624 and having a variable length.

The elastic portion 613 may have the length variable in response to a provided tension or compressive force, and may generate a restoring force for returning to an original shape thereof when the external force disappears. For example, the elastic portion 613 may be formed in a shape of a spring, and the coupling portion 624 may have a coupling screw 6241 on the outer circumferential surface thereof to which an inner circumferential surface of the elastic portion 613 may be seated and fixed.

Even when the actuator 700 pulls the extension 612 excessively, while the excessive force is buffered by the elastic portion 613, only an appropriate force may be transmitted to the ascending and descending portion 620. Accordingly, the ascending and descending portion 620 may support the support 500 by pressing the support 500 to an appropriate level.

Accordingly, even when the support 500 rotates, the vibration or the friction force applied to the ascending and descending portion 620 may be reduced.

Moreover, even when the vibration is transmitted to the rotating portion 640, the elastic portion 613 may absorb some of the shock or the vibration to prevent the connection portion 610 and the ascending and descending portion 620 from being damaged. In addition, the position of the ascending and descending portion 620 may be restored again, so that the support 500 may be stably supported.

FIG. 17 shows an application embodiment of the moving portion 600 and the actuator 700.

Referring to (a) in FIG. 17, the link 630 may be fixed to the cover 900 and the ascending and descending portion 620 may be rotatably coupled to the link 630 to support the support 500.

The connection portion 610 may connect the ascending and descending portion 620 and the actuator 700 to each other to rotate the ascending and descending portion 620 to lift and lower the support 500.

The actuator 700 may include a motor 710 that provides the power to rotate the ascending and descending portion 620, and a rotating bar 720 that may rotate with a certain radius T2 by the motor 710. The coupling ring 611 may be coupled to the rotating bar 720.

The rotating bar 720 may rotate to be closer to or away from the link 630 by the motor.

The actuator 700 may push or pull the coupling portion 624 by rotating the rotating bar 720 toward or away from the ascending and descending portion 620.

Referring to (b) in FIG. 17, the actuator 700 may rotate the rotating bar 720 to pull the ascending and descending portion 620. The ascending and descending portion 620 may rotate to lift the support 500 by an ascending length T1.

As a result, the coupler 400 may ascend by the ascending length T1 to couple the driving shaft 130 and the housing 300 to each other.

The actuator 700 may rotate the rotating bar 720 by the pulling length T2. That is, the actuator 700 may rotate the rotating bar 720 such that the rotating diameter of the rotating bar 720 corresponds to the pulling length T2.

The pulling length T2 may be greater than the ascending length T1. As a result, the actuator 700 may pull the ascending and descending portion 620 by a length greater than the ascending length T1.

In one example, because the ascending and descending portion 620 has a limitation in moving by the ascending length T1, the elastic portion 613 of the connection portion 610 may extend by a difference length T3 corresponding to a difference between the pulling length T2 and the ascending length T1.

Accordingly, the actuator 700 moves the ascending and descending portion 620 by the length greater than the ascending length T1, so that the ascending and descending portion 620 may sufficiently lift the support 500 to a target position, and the ascending and descending portion 620 may maintain sufficient force to support the support 500.

In addition, even when the vibration is transmitted from the driver 100, the tub 20, and the like through the support 500, the elastic portion 613 may extend or contract by the difference length T3 to attenuate or buffer the vibration. Accordingly, damage to entirety of the actuator 700 and the moving portion 600 may be prevented.

In one example, the coupling ring 611 may move the rotating bar 720 by the allowable length T4. Accordingly, it is possible to prevent interference of the rotation of the rotating bar 720 resulted from restriction of the rotating bar 720 by the length of the connection portion 610.

The rotating bar 720 may freely rotate the motor 710 by reciprocating between both ends of the coupling ring 611.

In this connection, the allowable length T4 may be smaller than the pulling length T2. Accordingly, it is possible to prevent the rotating bar 720 from rotating regardless of the connection portion 610.

The rotating housing 330 may further include a fixing screw 332 for fixing the rotation shaft 200 or the gearbox 340 inside the housing 300.

FIG. 18 shows a structure in which the clutch C is installed on the bottom surface of the tub 20.

The housing 300 accommodating the driving shaft 130 therein may be installed in the bearing housing 23 located at a center of the bottom surface 22 of the tub 20.

The support 500 for moving the coupler 400 may be installed beneath the housing 300. The moving portion 600 may be connected to the support 500.

Because the coupler 400 is accommodated in the housing 300, the support 500 and the moving portion 600 may also be disposed to overlap the housing 300 in the height direction.

Accordingly, the actuator 700 for operating the moving portion 600 may also be disposed to overlap the housing 300.

Accordingly, the actuator 700 may be coupled to and fixed to the bottom surface 22 of the tub 20 without a separate support member. In addition, the actuator 700 may be disposed to overlap the driver 100 in the height direction.

Accordingly, the height occupied by the clutch C independently inside the cabinet 10 may be reduced. Accordingly, a volume of the tub 20 may be increased that much.

Furthermore, the actuator 700 may be disposed to overlap the driver 100 in the height direction.

FIG. 19 shows another embodiment of the support 500.

Referring to (a) in FIG. 19, in the support 500, the support body 510 may be omitted.

The support 500 may be formed as the insertion body 520 inserted into the housing 300 from the outside of the housing 300 and fixed to the coupler 400, and the moving portion 600 may directly support the insertion body 520 to lift and lower the insertion body 520.

Therefore, the process of coupling the support body 510 to the housing 300, or the process of installing the insertion body 520 to the support body 510 may be omitted.

The insertion body 520 may be composed of the pipe-shaped first insertion body 521 and second insertion body 522, and the moving portion 600 may support the two first insertion body 521 and second insertion body 522.

However, as shown, the insertion body 520 may be constructed such that a portion thereof exposed to the outside of the housing 300 is wider than that in a simple pipe to further enlarge an area in contact with the moving portion 600.

The insertion body 520 may include a first insertion support 523 that may be inserted into the through-hole 3131 from one surface or one side of the housing 300 to support the coupler 400, and a second insertion support 524 that may be inserted into the through-hole 3131 from the other surface or the other side of the housing 300 to support the coupler 400.

The first insertion support 523 may include first fixing pipes 5231 inserted into the plurality of through-holes 3131 to support one surface and the other surface of the coupler 400, respectively, first extensions 5233 extending outwardly from the plurality of first fixing pipes 5231 to expand an outer surface of the insertion body 520, respectively, and a first portion-to-be-seated 5232 that may connect distal ends of the respective first extensions 5233, which are ends of the respective first extensions 5233 not connected to the first fixing pipes 5231, to each other and be seated on the moving portion 600.

The first fixing pipe 5231 may serve as the first insertion body 521 and the second insertion body 522, and the first extension 523 may increase an area or a radius of the insertion body 520 so as to be stably supported by the moving portion 600.

The first portion-to-be-seated 5232 may extend from the distal ends of the respective first extensions 5233 outwardly of the housing 300 to extend and connect ends of the respective first fixing pipes 5231 to each other in a closed curve.

Accordingly, the plurality of first fixing pipes 5231 may be connected to the first portion-to-be-seated 5232 to form one body.

The first portion-to-be-seated 5232 may form a curve extending in a direction away from the housing 300. Accordingly, it is possible to secure an area in which the first insertion support 523 is seated on the moving portion 600, as well as to prevent the first insertion support 523 from being inclined.

The first extension 5233 may derive an effect of enlarging an inner area of the first portion-to-be-seated 5232.

The first extension 5233 may include a first width extension 5223a extending outwardly from the first fixing pipe 5231 to expand a total area of the first insertion support 523, a first stabilization induction portion 5233b that is bent from the first width extension 5233a toward the housing 300 to reinforce rigidity of the first insertion support 523, and a first width extension 5233c extending in a direction away from the first fixing pipe 5231 from the first stabilization induction portion 5233b.

The first width extension 5233a may extend such that the first stabilization induction portion 5233b may be in contact with the outer circumferential surface of the housing 300, and the first stabilization induction portion 5233b may extend in parallel with the first fixing pipe 5231.

The first stabilization induction portion 5233b may have a length the same as or smaller than a length of the first fixing pipe 5231.

The first portion-to-be-seated 5232 may be constructed such that at least a portion thereof may deviate to the outside of the gripping arm 623 when being seated on the gripping arm 623.

In one example, the second insertion support 524 may be formed symmetrically with the first insertion support 523.

The second insertion support 524 may include second fixing pipes 5241 inserted into the through-hole 3231 to support the coupler 400, second extensions 5243 extending from the second fixing pipe 5241, respectively, and a second portion-to-be-seated 5242 extending from the second extension 5243 and seated on the support 600.

A free end of the second fixing pipe 5241 may be in contact with the first fixing pipe 5231 when supporting the coupler 400.

In addition, the second fixing pipe 5241 and the first fixing pipe 5231 may be disposed to face each other in the support accommodating portion 440, and may be disposed to be spaced apart from each other by a predetermined distance.

In one example, the first insertion body 523 and the second insertion body 524 may rotate together with the housing 300.

Therefore, the first insertion body 523 and the second insertion body 524 may need to be always supported by the ascending and descending portion 620 even when the housing 300 rotates.

To this end, a distance between the distal ends of the respective first extensions 5233 may be twice the length from the free end of the first fixing pipe 5231 to a furthest region of the first portion-to-be-seated 5232. In addition, a distance between distal ends of the respective second extensions 5243 may be twice the length from a free end of the second fixing pipe 5241 to a furthest region of the second portion-to-be-seated 5242.

In other words, the first portion-to-be-seated 5232 may be formed in a semi-circular shape, the second portion-to-be-seated 5242 may also be formed in a semi-circular shape. Accordingly, the first portion-to-be-seated 5232 and the second portion-to-be-seated 5242 may form a single circle.

A diameter of the circle formed by the first portion-to-be-seated 5232 and the second portion-to-be-seated 5242 may correspond to the distance between the distal ends of the respective first extensions 5233, and may correspond to the distance between the distal ends of the respective second extensions 5242.

It may be seen that the first extension 5233 extends from the first fixing pipe 5231 in order to ensure that the distance between the distal ends of the respective first extensions 5233 corresponds to a maximum diameter of the first portion-to-be-seated 5232.

In addition, it may be seen that the second extension 5243 extends from the second fixing pipe 5241 in order to ensure that the distance between the distal ends of the respective second extensions 5243 corresponds to a maximum diameter of the second portion-to-be-seated 5242.

As a result, the first insertion support 523 and the second insertion support 524 may be alternately or simultaneously supported by the gripping arm 623 while rotating.

Although not shown, the restoring portion 800 may press the first insertion support 523 and the insertion support 524. However, the restoring portion 800 may be omitted.

Referring to (b) in FIG. 19, the ascending and descending portion 620 may support the first portion-to-be-seated 5232 and the second portion-to-be-seated 5233 to lift and lower the first insertion support 523 and the second insertion support 524.

The plurality of first fixing pipes 5231 may ascend or descend at the same time by the first extensions 5233 and the first portion-to-be-seated 5232, and the plurality of second fixing pipes 5241 may ascend or descend at the same time by the second extensions 5243 and the second portion-to-be-seated 5242.

In one example, the first stabilization induction portion 5233b and a second stabilization induction portion 5243b may be in contact with each other.

Accordingly, even when rotating with the housing 300, the first insertion support 523 and the second insertion support 524 may be seated on the ascending and descending portion 620.

FIG. 20 is a cross-sectional view of an embodiment in which the support 500 ascends and descends.

Referring to (a) in FIG. 20, the first fixing pipes 5231 may be respectively inserted into the through-holes 3131 to be seated on the support accommodating portion 440 of the coupler 400. One first fixing pipe 5231 may be seated on one side of the coupler 400, and the other first fixing pipe 5231 may extend in parallel with said one first fixing pipe 5231 and be seated on the other side of the coupler 400.

The ascending and descending portion 620 may support the first portion-to-be-seated 5232.

When the ascending and descending portion 620 lowers the first portion-to-be-seated 5232, the first fixing pipe 5231 may be located at a lower end of the through-hole 3131 and the coupler 400 may descend.

The coupler 400 may be coupled to the power transmitting portion 341 and coupled to the coupling transmitting portion 313.

Accordingly, when the driving shaft 130 rotates, the coupler 400 may rotate therewith. In addition, when the coupler 400 rotates, the housing 300, the first insertion support 523, and the second insertion support 524 may rotate.

Referring to (b) in FIG. 20, when the ascending and descending portion 620 lowers the first portion-to-be-seated 5232, the first fixing pipe 5231 may be located at an upper end of the through-hole 3131 and the coupler 400 may ascend.

The coupler 400 may be separated from the power transmitting portion 341.

Accordingly, when the driving shaft 130 rotates, the coupler 400 and the housing 300 may not rotate.

FIG. 21 shows another embodiment of the moving portion 600.

The embodiment shown in FIG. 21 may be different from the above-described embodiment only in the configuration of the moving portion 600, and the rest may be the same.

Referring to FIG. 21, the moving portion 600 may not lift or lower the support 500 by mechanically supporting the support 500, but may lift and lower the support 500 in a state of being physically spaced apart from the support 500.

For example, the moving portion 600 may use an electromagnetic force to space the support 500 apart therefrom.

As such, the moving portion 600 and the support 500 do not come into contact with each other, so that occurrence of noise and vibration may be ameliorated.

For example, the moving portion 600 may include an electromagnetic unit 660 disposed outside the housing 300 to generate an electromagnetic field toward the support body 510, and a magnetic ascending and descending portion 670 that is coupled to the support body 510 and moves to be away from or close to the electromagnetic unit 660 by the electromagnetic field.

The electromagnetic unit 660 may include a magnetic force generator 661 connected to a controller or the like to receive current and generate the electromagnetic field. The magnetic force generator 661 may be formed as a magnetic body, for example, as a coil, capable of generating the magnetic field.

Accordingly, the magnetic force generator 661 may selectively generate the magnetic field.

Because the magnetic force generator 661 is to transmit the electromagnetic field to the support body 510, the magnetic force generator 661 may accommodate the shaft housing 310 therein.

The magnetic force generator 661 may be fixed to a lower portion of the support body 510 or may accommodate the support body 510 therein.

The electromagnetic unit 660 may further include a magnetic force generator accommodating portion 662 that accommodates the magnetic force generator 661 therein to fix the magnetic force generator 661 inside the clutch cover 900, and may further include a magnetic force generator accommodating hole 663 such that the shaft housing 310 may be accommodated therethrough.

The magnetic force generator accommodating portion 662 may be made of a resin-based material capable of passing the magnetic field therethrough, and may block the current flowing through the magnetic force generator 661 from leaking to the outside.

The support body 510 may be formed as a magnetic body to ascend and descend by receiving the electromagnetic field generated from the magnetic force generator 661.

However, in order to reduce a load of the support body 510, the support body 510 may be coupled to the magnetic ascending and descending portion 670 or accommodated in the magnetic ascending and descending portion 670.

The magnetic ascending and descending portion 670 may include a magnetic force receiver 671 coupled to a surface of the support body 510 to face the electromagnetic unit 660.

The magnetic force receiver 671 may be disposed on an outer circumferential surface of the support body 510, and may support the bottom surface of the support body 510 to be prevented from being separated from the support body 510.

The magnetic force receiver 671 may also serve as a body support 672 for supporting the lower portion of the support body 510.

At least one of the components of the magnetic ascending and descending portion 670 may be coupled to the outer circumferential surface of the support body 510 to receive the electromagnetic field to generate a force for moving close to or away from the electromagnetic unit.

The magnetic ascending and descending portion 670 may be formed as a permanent magnet or the like so as to be closer to or farther away from the electromagnetic unit 660 by the magnetic field generated by the electromagnetic unit 660.

For example, when the current flows through the electromagnetic unit 660 or an amount of current flowing through the electromagnetic unit 660 varies, an induced current may be generated to transmit the electromagnetic field to the magnetic ascending and descending portion 670.

In addition, the electromagnetic unit 660 may also vary a direction of the current to switch a direction of the electromagnetic field.

Accordingly, the magnetic ascending and descending portion 670 may receive attractive and repulsive forces by the electromagnetic field to ascend or descend along the shaft housing 310, and the coupler 400 may couple or separate the driving shaft 130 and the housing 300 to or from each other while ascending and descending.

FIG. 22 is a cross-sectional view of the clutch C in which the moving portion 600 is installed.

The electromagnetic unit 660 may surround the outer circumferential surface of the shaft housing 310, and may define therein a space in which the shaft housing 310, the support body 510, and the magnetic force receiver 670 ascend or descend.

The electromagnetic unit 660 may be disposed on a side of the support body 510 rather than below the support body 510. Accordingly, the electromagnetic unit 660 may sufficiently secure a space for the support body 510 to ascend and descend.

The electromagnetic unit 660 may be disposed above the support bearing 552, and may be disposed below the first distal end 131.

The electromagnetic unit 660 may selectively generate the electromagnetic field or transmit the electromagnetic field by changing directions of an N-pole and a S-pole.

It may be disposed below the coupling body 312 of the shaft housing 310. The magnetic force generator accommodating hole 663 of the electromagnetic unit 660 may have a diameter larger than a diameter of the magnetic ascending and descending portion 670 such that an inner circumferential surface of the electromagnetic unit 660 and an outer circumferential surface of the magnetic ascending and descending portion 670 are spaced apart from each other by a predetermined spacing.

The magnetic ascending and descending portion 670 may be disposed on the outer circumferential surface of the support body 510 to be able to face the electromagnetic unit 660. In addition, the magnetic ascending and descending portion 670 may support a lower end of the support body 510 to prevent the support body 510 from deviating from the magnetic ascending and descending portion 670 by inertia when the magnetic ascending and descending portion 670 ascends or descends.

The magnetic ascending and descending portion 670 may ascend when the magnetic field of the electromagnetic unit 660 is generated, and may ascend when the magnetic force is generated in a specific direction from the electromagnetic unit 660.

The electromagnetic unit 660 may be fixed to the clutch cover 900, and the magnetic ascending and descending portion 670 may rotate together with the support body 510.

FIG. 23 shows an operational embodiment of the moving portion 600.

Referring to (a) in FIG. 23, the magnetic field may not be generated from the electromagnetic unit 660, or the electromagnetic field may be generated in a direction of pushing the magnetic ascending and descending portion 670.

For example, a surface of the magnetic ascending and descending portion 670 may have the N pole, so that the electromagnetic unit 660 may be controlled to have the N pole therein.

The magnetic ascending and descending portion 670 may be lowered by the electromagnetic unit 660 to lower the support body 510. Accordingly, the insertion body 520 may descend, and thus, the coupler 400 may descend.

The magnetic ascending and descending portion 670 may descend by deviating from the interior of the electromagnetic unit 660 together with the support body 510.

The coupler 400 may descend in a state in which the outer circumferential surface thereof is always engaged with the coupling transmitting portion 313 of the housing 300. When the coupler 400 descends, an inner circumferential surface of the coupler 400 may be engaged with the power transmitting portion 134 of the driving shaft 130.

Alternatively, the coupler 400 may descend in a state of being always engaged with the power transmitting portion 134 of the driving shaft 130. When the coupler 400 descends, the outer circumferential surface of the coupler 400 may be engaged with the coupling transmitting portion 313 of the housing 300.

As a result, the coupler 400 may couple the driving shaft 130 and the housing 300 to each other to transmit the rotational force of the driving shaft 130 to the housing 300.

In one example, the clutch C may further include a magnetic support 680 capable of adjusting a height of the electromagnetic unit 660.

The magnetic support 680 may fix the electromagnetic unit 660 to the clutch cover 900, and may support the electromagnetic unit 660 to fix a vertical level at which the electromagnetic unit 660 is installed.

Accordingly, the electromagnetic unit 660 may be spaced apart from the clutch cover 900 and positioned above the shaft housing 311 to selectively lift the magnetic ascending and descending portion 670 through an attractive force.

Accordingly, the magnetic ascending and descending portion 670 may easily descend by a self-load or by an elastic force of the restoring portion 800.

Referring to (b) in FIG. 23, the magnetic field may be generated from the electromagnetic unit 660, or the electromagnetic field may be generated in a direction of pulling the magnetic ascending and descending portion 670.

For example, the surface of the magnetic ascending and descending portion 670 may have the N pole, so that the electromagnetic unit 660 may be controlled to have the S pole therein.

The magnetic ascending and descending portion 670 may be lifted by the electromagnetic unit 600 to lift the support body 510. Accordingly, the insertion body 520 may ascend, and thus, the coupler 400 may ascend.

The magnetic ascending and descending portion 670 may ascend while being accommodated into the electromagnetic unit 660 together with the support body 510.

The coupler 400 may ascend in a state in which the outer circumferential surface thereof is always engaged with the coupling transmitting portion 313 of the housing 300. When the coupler 400 ascends, the inner circumferential surface of the coupler 400 may be separated from the power transmitting portion 134 of the driving shaft 130.

Alternatively, the coupler 400 may ascend in a state of being always engaged with the power transmitting portion 134 of the driving shaft 130. When the coupler 400 ascends, the outer circumferential surface of the coupler 400 may be separated from the coupling transmitting portion 313 of the housing 300.

As a result, the coupler 400 may separate the driving shaft 130 from the housing 300 to block the rotational force of the driving shaft 130 from being transmitted to the housing 300.

FIG. 24 shows another embodiment of the moving portion 600.

The embodiment shown in FIG. 24 may be different from the above-described embodiments only in the configuration of the moving portion 600, and the rest may be the same.

The moving portion 600 may include the rotating portion 640 that supports the support body 510 and is rotatable along a circumference of the housing 300, and a casing 650 coupled to the driver 100 to support lifting and lowering the rotating portion 640 when the rotating portion 640 rotates.

The casing 650 may further include an upper cover 657 for accommodating at least one of the rotating portion 640, the actuator 700, and a sensor S therein to prevent the rotating portion 640, the actuator 700, and the sensor S from deviating or varying in an installed position thereof.

The rotating portion 640 may be accommodated in the casing 650, and the actuator 700 may be disposed inside the casing 650 to directly rotate the rotating portion 640.

Accordingly, the rotating portion 640 may lift and lower the coupler 400 by lifting and lowering the support body 510 while ascending and descending.

FIG. 25 shows an ascending and descending structure of the moving portion 600.

Referring to (a) in FIG. 25, the casing 650 may include an accommodating body 651 for guiding the ascending and descending of the rotating portion 640 and the coupler 400, a coupling portion 624 extending from the accommodating body 651 and coupled and fixed to the stator 110, and an ascending and descending rib 654 disposed on one surface of the accommodating body 651 to support the rotating portion 640.

In one example, the ascending and descending rib 654 may be disposed anywhere as long as it is able to support the rotating portion 640 by being fixed to the casing 650.

The accommodating body 651 may be formed in a cylindrical or pipe shape.

The accommodating body 651 may be accommodated in the rotating portion 640 and guide the ascending and descending of the rotating portion 640.

The ascending and descending rib 654 may protrude from an outer circumferential surface of the accommodating body 651, and may include a plurality of ascending and descending ribs spaced apart from each other along the outer circumferential surface of the accommodating body 651. The ascending and descending rib 654 may support a load of the rotating portion 640.

The rotating portion 640 may include a moving body 641 that supports the coupler 400 and rotates by the actuator 700, and an ascending and descending induction portion 642 supported by the ascending and descending rib 620 to lift and lower the moving body 641.

The moving body 641 may be formed in a cylindrical or pipe shape for accommodating the accommodating body 651 therein.

The ascending and descending induction portion 642 may be supported on an upper end of the ascending and descending rib 654 on one surface of the moving body 641. The ascending and descending induction portion 642 may be seated on the upper end of the ascending and descending rib 654 as one surface of the moving body 641 is protruded or inserted.

The ascending and descending induction portion 642 may be disposed along an inner circumferential surface of the moving body 641. The ascending and descending induction portion 642 may be constructed such that a vertical level thereof disposed on the inner circumferential surface of the moving body 641 varies. Accordingly, the ascending and descending induction portion 642 may lift or lower the moving body 641 while sliding along the ascending and descending rib 654.

The rotating portion 640 may further include gear teeth 643 that may rotate in engagement with the actuator 700. The gear teeth 643 may receive power generated from the actuator 700 on one surface of the moving body 641.

The gear teeth 643 may be disposed on an outer circumferential surface of the moving body 641, and may be disposed along a circumference of the moving body 641. A surface of the gear teeth 643 may be in a serration form to be directly engaged with the actuator 700.

Accordingly, a separate mediator for connecting the actuator 700 and the rotating portion 640 to each other may be omitted, and the actuator 700 may directly rotate the rotating portion 640.

Accordingly, the actuator 700 may rotate the rotating portion 640 at least once, and may transmit all outputs of the actuator 700 to the rotating portion 640 as it is.

In one example, the gear teeth 643 may protrude more thickly from the moving body 641 to the outside in order to reinforce rigidity of the rotating portion 640 or increase a coupling force of the rotating portion 640.

In addition, the gear teeth 643 may be thicker than the moving body 641.

The rotating portion 640 may further include a contact portion 644 protruding to the outside from the surface of the moving body 641 to be in contact with the sensor S.

The sensor S may sense a position of the rotating portion 640 in direct contact with the rotating portion 640. Accordingly, the sensor S may be disposed separately from the actuator 700, and the position of the rotating portion 640 may be more accurately sensed.

The actuator 700 and the sensor S may be seated in the casing 650.

Accordingly, the actuator 700, the sensor S, the coupler 400, and the rotating portion 640 may all be installed in the casing 650. Accordingly, the casing 650 may be formed as a single module of the clutch C.

Therefore, installation of the clutch C may be completed only by coupling the casing 650 to the driver 100.

In addition, because the casing 650 is disposed inside a stator core 111, all of the components of the clutch C may be disposed inside the core 111. Accordingly, a volume or a height occupied by the clutch C independently of the driver 100 may be omitted or reduced.

Accordingly, a height of the tub 20 may be further enlarged, and a spacing between the tub 20 and the driver 100 may be reduced.

The actuator 700 may include a power generator 710 for generating power to rotate the rotating portion 640. The power generator 710 may be in direct contact with the rotating portion 640 to rotate the rotating portion 640.

The actuator 700 may further include a transmitting portion 720 for transmitting the output of the power generator 710 to the rotating portion 640. The transmitting portion 720 may further enlarge a contact area with the rotating portion 640 than the power generator 710. The transmitting portion 720 may be formed of a type of a worm gear that may rotate while being tangentially engaged with the outer circumferential surface of the rotating portion 640.

The rotating portion 640 may be accommodated in the casing 650, and may be seated on a bottom surface of the casing 650.

The actuator 700 may be disposed to be engaged with the gear teeth 643 disposed on the outer circumferential surface of the rotating portion 640.

The actuator 700 may be in a state in which the power generator 710 is engaged with the gear teeth 643.

When the transmitting portion 720 is disposed, the power generator 710 may be engaged with the transmitting portion 720, and the transmitting portion 720 may be engaged with the gear teeth 643. The transmitting portion 720 may have a gear ratio or a diameter capable of increasing torque while lowering an rpm of the power generator 710.

The sensor S may sense that the rotating portion 640 has descended in the casing 650. The rotating portion 640 and the sensor S may come into contact with each other, and the sensor S may sense the position of the rotating portion 640 while repeatedly coming into contact with/being separated from the rotating portion 640.

For example, the sensor S may sense the state of being separated from the rotating portion 640. The controller that controls the sensor S or receives a signal from the sensor may calculate that the rotating portion 640 has descended in the casing 650 and that the coupler 400 is coupled to the driver 100.

The ascending and descending induction portion 642 of the rotating portion 640 may extend with a variable height from one surface of the rotating portion 640. The ascending and descending induction portion 642 may extend while moving between an upper end and a lower end of the inner circumferential surface of the rotating portion 640.

As shown, when the ascending and descending rib 654 fixed to the casing 650 supports the ascending and descending induction portion 642 located at the upper end of the rotating portion 640, the rotating portion 640 may maintain the state of being lowered in the casing 650.

When the actuator 700 is driven, the rotating portion 640 may be rotated in one direction.

Referring to (b) in FIG. 25, when the rotating portion 640 rotates, the ascending and descending induction portion 642 may slide at the upper end of the ascending and descending rib 654. In this connection, because the ascending and descending induction portion 642 extends to vary in the height, the ascending and descending induction portion 642 extending from the upper end toward the lower end of the rotating portion 640 may be supported by the ascending and descending rib 654. As a result, the rotating portion 640 may be supported by the ascending and descending rib 654 while rotating to ascend.

In this connection, when the rotating portion 640 ascends to a vertical level equal to or higher than a certain vertical level, the contact portion 644 protruding from the rotating portion 640 may come into contact with the sensor S.

As such, the sensor S may sense that the rotating portion 640 has ascended to the vertical level equal to or higher than the certain vertical level, and the controller may calculate that the coupler 500 is separated from the driver 100.

When the actuator 700 is driven again, the rotating portion 640 may descend again to return to a state as shown in (a) in FIG. 25.

The gear teeth 643 of the rotating portion 640 may be disposed along a circumference of the rotating portion 640. Accordingly, the actuator 700 may rotate the rotating portion 640 at least once, and may continuously rotate the rotating portion 640 in one direction.

In this process, the rotating portion 640 may repeat ascending and descending, and the coupler 400 may be repeatedly separated from and coupling with the driver 100.

As a result, the laundry treating apparatus of the present disclosure may be constructed such that the actuator 700 may directly rotate the rotating portion 640.

The actuator 700 may transmit generated rotational energy to the rotating portion 640 as it is without converting the rotational energy into a linear motion/reciprocal rotation at a constant angle.

As a result, the laundry treating apparatus of the present disclosure may omit a separate mediator that converts the rotational energy generated by the actuator 700 into energy other than the rotational energy.

Therefore, because the actuator 700 and the rotating portion 640 may become closer to each other that much or may come into contact with each other, the actuator 700 may be completely installed inside the driver 100.

FIG. 26 shows a structure in which the moving portion may ascend and descend inside the casing.

Referring to (a) in FIG. 26, the casing 650 may include the accommodating body 651 for guiding the ascending and descending of the rotating portion 640, an external body 652 disposed outwardly of the accommodating body 651 to shield the rotating portion 640, and the coupling portion 624 extending from the outer body 652 to the outer circumferential surface.

The external body 652 may be disposed in parallel with the accommodating body 651, and may have a larger diameter than the accommodating body 651. Between the external body 652 and the accommodating body 651, a space in which at least one of the actuator 700, the sensor S, and the rotating portion 640 may be seated or installed may be secured.

In one example, the external body 652 may have the larger diameter than the accommodating body 651, but may be spaced apart from the inner circumferential surface of the core 111. As a result, air may flow between the external body 652 and the inner circumferential surface of the core 110 to prevent the driver 100 from overheating.

In addition, the external body 652 may be disposed to be further spaced apart from the inner circumferential surface of the core 110, except for the space where the actuator 700 and the sensor S are installed.

The coupling portion 653 may include a plurality of coupling portions radially extending from the external body 652. The coupling portion 653 may extend from the external body 652 toward the inner circumferential surface of the core 111, and may be coupled to the core 111 to fix the casing 650 inside the stator 110.

The coupling portions 653 may be uniformly spaced apart from each other with respect to the accommodating body 651 at an angle obtained by dividing 360 degrees by the number of coupling portions. Accordingly, the coupling portion 653 may support the casing 650 while distributing a load of the casing 650.

In one example, a through section through which air may flow may be secured between the coupling portion 653 and the driver 100. Accordingly, a heat dissipation effect of the driver 100 may be maximized.

The external body 652 may include a seating body e extending outwardly from the accommodating body 651 and positioned below the rotating portion 640, a shielding body a extending from an outer circumferential surface of the seating body d to accommodate the outer circumferential surface of the rotating portion 640 therein, an installation body d extending outwardly from the shielding body a to provide a space in which the actuator 700 or the sensor S is installed, and a blocking body b extending from the exterior of the installation body d to shield the actuator 700 or the sensor S.

The casing 650 may include a motor installation portion 655 on which the actuator may be seated and a sensor installation portion 656 on which the sensor S may be installed on the installation body d.

In the casing 650, the blocking body b and the installation body d may be omitted between a specific coupling portion 653 and another coupling portion 653 spaced therefrom. Accordingly, a communication space 9 is defined to allow the driver 100 to radiate heat.

A coupling hook 601 may be disposed on an outer surface of the casing 650.

In one example, the casing 650 may include the ascending and descending rib 654 that supports the rotating portion 640 to lift and lower the rotating portion 640. The ascending and descending rib 654 may be disposed in any one of the accommodating body 651, the seating body e, and the shielding body a, as long as it is able to support the rotating portion 640.

Referring to (b) in FIG. 26, when the ascending and descending rib 654 is disposed on the accommodating body 651, the ascending and descending rib 654 may protrude from the outer circumferential surface of the accommodating body 651. The ascending and descending rib 654 may have a height equal to or smaller than a height of the accommodating body 651.

The ascending and descending ribs 654 may be arranged to be spaced apart from each other at a predetermined angle along the circumference of the accommodating body 651. For example, when the number of ascending and descending ribs 654 is n, the ascending and descending ribs 654 may be arranged to be spaced apart from each other by an angle of 360/n degrees.

As such, it is possible to prevent the rotating portion 640 from being inclined.

Referring to (c) in FIG. 26, the ascending and descending induction portion 642 may be disposed on the inner circumferential surface of the moving body 641 to be supported by the ascending and descending rib 654.

The ascending and descending induction portion 642 may include a low point support 6421 disposed on the moving body 641, and a high point support 6423 disposed below the low point support 6421.

The high point support 6423 may be disposed adjacent to a lower end of the moving body 641, and the low point support 6421 may be disposed adjacent to an upper end of the moving body 641.

The low point support 6421 may be supported by the ascending and descending rib 654 when the moving body 641 is at a low point, and the high point support 6423 may be supported by the ascending and descending rib 654 when the moving body 641 is at a high point.

The high point support 6423 and the low point support 6421 may be disposed to be spaced apart from each other so as not to overlap in a direction of the driving shaft.

Accordingly, when the rotating portion 640 rotates, the ascending and descending rib 654 may move from the high point support 6423 to the low point support 6421, and move from the low point support 6421 to the high point support 6423.

In the ascending and descending induction portion 642, the lower point support and the high point support may further include an ascending support 6422 and a descending support 6424 for connecting the lower point support and the high point support to each other.

The ascending support 6422 may be supported by the ascending and descending rib 654 when the moving body 641 moves from the low point to the high point.

When the low point support 6421 is disposed on both sides of the high point support 6423, the ascending and descending induction portion 642 may include the ascending support 6422 connected from one end of the high point support 6423 to one end of the low point support 6421, and the descending support 6424 connected from the other end of the high point support 6423 to the other end of the low point support 6421.

In addition, the low point support 6421 may extend from one end of the descending support 6424 to the other end of the high point support 6423.

Specifically, when the rotating portion 640 is constructed to rotate in one direction, it may be seen that the rotating portion 640 further includes the ascending support 6422 extending from the low point support 6421 toward the high point support 6423, and the descending support 6424 extending from the high point support 6423 toward the low point support 6421.

As a result, as the low point support 6421, the ascending support 6422, the high point support 6423, and the descending support 6424 are sequentially seated on the ascending and descending rib 654, the moving body 641 may ascend and descend.

The rotating portion 640 may include a body support 645 for supporting the support body 510 inside the moving body 641.

The body support 645 may include a plurality of body supports extending in the ascending and descending induction portion 642 to be spaced apart from each other, and upper ends of the plurality of body supports may be disposed at the same vertical level.

Accordingly, the support body 510 may be seated on the body support 645 to ascend and descend together with the rotating portion 640. Accordingly, the insertion body 520 and the coupler 400 may ascend together.

FIG. 27 is a view showing the moving portion ascending and descending.

Although only the ascending and descending rib 654 close to the actuator 700 is shown as an example, the ascending and descending rib 654 may include the plurality of ascending and descending ribs. For example, three ascending and descending ribs 654 may be disposed, and may be disposed to be spaced apart from each other by 120 degrees on the outer circumferential surface of the accommodating body 651. The ascending and descending induction portion 642 may also be disposed to correspond to the ascending and descending rib 654. For example, the ascending and descending induction portion 642 may also include three ascending and descending induction portions and the three ascending and descending induction portions may extend along the inner circumferential surface of the moving body 641.

The rotating portion 640 may include the contact portion 644 that rotates in engagement with the actuator 700 on the outer circumferential surface thereof.

The gear teeth 643 may include low point gear teeth 6431 that may be engaged with the actuator 700 when the rotating portion 640 is at the low point, and high point gear teeth 533 that may be engaged with the actuator 700 when the rotating portion 640 is at the high point. The low point gear teeth 6431 may be disposed lower than the high point contact portion 533 or may have a length in an axial direction smaller than that of the high point gear teeth 6433.

The gear teeth 643 may further include ascending gear teeth 6432 that may be engaged with the actuator 700 when the rotating portion 640 moves from the low point to the high point, and descending gear teeth 6434 that may be engaged with the actuator 700 when the rotating portion 640 moves from the high point to the low point Referring to (a)

in FIG. 27, the low point support 6421 may be supported by the ascending and descending rib 654. In one example, when the low point support 6421 includes a plurality of low point supports 6421, all of the plurality of low point supports 6421 may be supported by the ascending and descending ribs 654.

The actuator 700 may be in contact with the low point gear teeth 6431.

The rotating portion 640 may be rotated counterclockwise by the actuator 700.

Referring to (b) in FIG. 27, the upper end of the ascending and descending rib 654 may sequentially support the low point support 6421, the ascending support 6422, and a lower end of the high point support 6423.

The actuator 700 may sequentially contact the low point gear teeth 6431, the ascending gear teeth 6432, and the high point gear teeth 533.

When the high point support 6423 is seated on top of the ascending and descending rib 654, the rotating portion 640 may maximally ascend.

The sensor S may be in contact with the contact portion 644 to sense that the rotating portion 640 is at the high point.

In one example, when the actuator 700 further rotates the rotating portion 640, the upper end of the ascending and descending rib 654 may sequentially support the high point support 6423, the descending support 6424, and the lower end of the low point support 6421. Accordingly, it is possible to return to the state of (a) in FIG. 12.

When the low point support 6421 is seated on top of the ascending and descending rib 654, the rotating portion 640 may maximally descend.

The actuator 700 may sequentially contact the high point gear teeth 6433, the descending gear teeth 6434, and the low point gear teeth 6431.

The sensor S may be spaced apart from the contact portion 644 when the rotating portion 640 descends. Accordingly, the controller may sense that the rotating portion 640 is at the low point.

The actuator 700 may be controlled by the controller to lift and lower the rotating portion 640 while rotating the rotating portion 640.

The high point support 6423 may have a length equal to or greater than a first length such that a vertical level of the ascended rotating portion 640 may be maintained for a predetermined time. The first length may be a length for the rotating portion 640 to be maintained for a first time even when the rotating portion 640 continuously rotates.

For example, the low point support 6421 may have a length so as to be maintained for 0.5 seconds or longer.

In one example, the low point support 6421 may also have a length equal to or greater than a second length such that a vertical level of the descended rotating portion 640 may be maintained for a predetermined time. The second length may be a length for the rotating portion 640 to be maintained for a second time even when the rotating portion 640 continuously rotates.

The second time may be 0.5 seconds.

In one example, an inclination of the ascending support 6422 may be more gentle than an inclination of the descending support 6424.

When the rotating portion 640 rotates at a uniform speed, a length of the ascending support 6422 may be greater than a length of the descending support 6424.

Accordingly, the rotating portion 640 may ascend slowly.

Therefore, it is possible to induce the coupler 400 to be stably separated from the rotor 120, and to lift the coupler 400 and the rotating portion 640 while loads thereof are stably supported by the actuator 700. In addition, the coupler 400 may ascend by stably overcoming the elastic force of the restoring portion 800.

In one example, the gear teeth 643 may also be disposed to have a shape and a length respectively corresponding to the shape and the length of the ascending and descending induction portion 642.

However, the arrangement of the gear teeth 643 may not exactly match the arrangement of the ascending and descending induction portion 642. In consideration of a contact point with the actuator 700, the gear teeth 643 may be alternately disposed with the ascending and descending induction portion 642. Even in this case, lengths and inclinations of the low point gear teeth 6431, the ascending gear teeth 6432, the high point gear teeth 6433, the descending gear teeth 6434, and the like may respectively correspond to the lengths and the inclinations of the low point support 6421, the ascending support 6422, the high point support 6423, the descending support 6424, and the like.

As described above, the sensor S of the laundry treating apparatus of the present disclosure may sense a vertical level or a position of the coupler 400 or the rotating portion 640.

In other words, the sensor S of the present disclosure does not indirectly sense or calculate the position of the coupler 400 by coming into contact with the actuator 700 or sensing the position of the actuator 700.

The sensor S of the laundry treating apparatus of the present disclosure may sense the vertical level of the coupler or the moving portion in direct contact with the coupler 400 or the rotating portion 640. Accordingly, the sensor S of the laundry treating apparatus of the present disclosure may further increase accuracy and reliability of sensing the position or the vertical level of the coupler 400 or the rotating portion 640.

In addition, the sensor S of the laundry treating apparatus of the present disclosure may more accurately sense whether the coupler 400 has coupled the housing 300 to the rotor 120 or has separated the housing 300 from the rotor 120.

In addition, the sensor S of the laundry treating apparatus of the present disclosure may accurately sense the position of the coupler 400 even when the actuator 700 is constrained or damaged.

In addition, because the sensor S of the laundry treating apparatus of the present disclosure operates independently of the actuator 700, the sensor S may be disposed spaced apart from the actuator 700. Accordingly, the sensor S of the laundry treating apparatus of the present disclosure may be spaced apart from the actuator 700 to sense whether the coupler 400 or the rotating portion 640 has ascended or descended.

In addition, because the sensor S and the actuator 700 may be spaced apart from each other, the sensor S and the actuator 700 may be installed separately even when the space inside the core 111 or the casing 650 is relatively narrow.

As a result, because the sensor S and the actuator 700 may be spaced apart from each other, the space inside the driver 100 may be effectively utilized.

The present disclosure may be modified and implemented in various forms, so that the scope thereof is not limited to the above-described embodiment. Therefore, when the modified embodiment includes a component of the claims of the present disclosure, it should be viewed as belonging to the scope of the present disclosure.

The invention claimed is:

1. A laundry treating apparatus comprising:
   a tub configured to store water therein;
   a drum rotatably located in the tub to receive laundry therein;
   a pulsator rotatably located in the drum to agitate the laundry;
   a driver coupled to the tub, the driver being configured to provide power to rotate at least one of the drum and the pulsator; and
   a clutch located between the driver and the pulsator to transmit the power to the at least one of the drum and the pulsator, the clutch including:
   a gear assembly rotatably engaged with the driver;
   a rotation shaft coupled to the gear assembly to rotate the pulsator;
   a housing coupled to the drum to rotate the drum, the housing being configured to receive the gear assembly and the rotation shaft therein;
   a coupler configured to connect and disconnect the driver to and from the housing to selectively rotate the housing, the coupler being located in the housing; and
   a support configured to lift and lower the coupler to separate or couple the driver and the housing from or to each other, at least a portion of the support being located outside the housing,
   wherein the support penetrates through the housing to support the coupler.

2. The laundry treating apparatus of claim 1, wherein the support includes an insertion body inserted into the housing to support the coupler, the insertion body being partially exposed to outside of the housing.

3. The laundry treating apparatus of claim 2, wherein the support further includes a support body receiving an outer circumferential surface of the housing therein, the support body being configured to support the insertion body.

4. The laundry treating apparatus of claim 3, wherein the insertion body includes:
   a first insertion body penetrating the support body and the housing to support a first surface of the coupler; and
   a second insertion body penetrating the support body and the housing to support a second surface of the coupler.

5. The laundry treating apparatus of claim 4, wherein the housing includes:
   a shaft housing configured to receive the coupler therein; and
   a plurality of through-holes in the shaft housing, the plurality of through-holes being configured to receive the first insertion body and the second insertion body, respectively, and
   wherein the support body includes an ascending/descending body configured to ascend and descend along a longitudinal direction of the shaft housing, the ascending/descending body including a plurality of holes configured to receive the first insertion body and the second insertion body.

6. The laundry treating apparatus of claim 5, wherein the housing further includes an installation guide configured to align the plurality of through-holes of the shaft housing with the plurality of holes of the ascending/descending body.

7. The laundry treating apparatus of claim 6, wherein the installation guide protrudes from or is recessed into an outer circumferential surface of the shaft housing along the longitudinal direction of the shaft housing, and
   wherein the ascending/descending body further includes a limiter recessed into or protruding from an inner circumferential surface of the ascending/descending body to slide along the installation guide.

8. The laundry treating apparatus of claim 3, wherein the clutch further includes a mover located outside of the housing, the mover being configured to lift and lower the support body, the mover including:

a link located outside of the housing; and an ascending/descending portion rotatably coupled to the link, the ascending/descending portion being configured to support the support body to lift and lower the coupler.

9. The laundry treating apparatus of claim 8, wherein the ascending/descending portion includes:

a rotation link rotatably coupled to the link;

a gripping arm extending from the rotation link toward the support body to support the support body; and an action arm extending from the rotation link away from the gripping arm to rotate the gripping arm.

10. The laundry treating apparatus of claim 8, wherein the insertion body includes:

a first insertion support inserted into a first surface of the housing to support the coupler, the first insertion support being supported by the mover; and a second insertion support inserted into a second surface of the housing to support the coupler, the second insertion support being supported by the mover.

11. The laundry treating apparatus of claim 10, wherein the mover is located outside of the housing to lift and lower the support body, and wherein the ascending/descending portion is rotatably coupled to the link to support the first insertion support and the second insertion support to lift and lower the coupler.

12. The laundry treating apparatus of claim 11, wherein the ascending/descending portion includes:

a rotation link rotatably coupled to the link;

a gripping arm branched from the rotation link toward the first insertion support and the second insertion support to support the first insertion support and the second insertion support; and an action arm extending from the rotation link away from the gripping arm to rotate the gripping arm.

13. The laundry treating apparatus of claim 8, further comprising a clutch cover coupled to the tub to receive the housing therein, the clutch cover being located above the driver to rotatably support the housing, wherein the link is fixed to an inner surface of the clutch cover.

14. The laundry treating apparatus of claim 3, wherein the clutch further includes a mover located outside of the housing, the mover being configured to lift and lower the support body, the mover including:

an electromagnetic unit configured to generate an electromagnetic field toward the support body; and a magnetic ascending/descending portion coupled to the support body, the magnetic ascending/descending portion configured to move away from or move towards the electromagnetic unit in response to the electromagnetic field.

15. The laundry treating apparatus of claim 14, wherein the electromagnetic unit is fixed outside of the housing, the electromagnetic unit accommodating the support body therein, and wherein the magnetic ascending/descending portion includes a magnetic force receiver coupled to an outer circumferential surface of the support body to receive the electromagnetic field to generate a force to move away from or move towards the electromagnetic unit.

16. The laundry treating apparatus of claim 3, wherein the clutch further includes a mover located outside of the housing, the mover being configured to lift and lower the support body, the mover including:

a rotating portion configured to support the support body, the rotating portion being rotatably arranged along a circumference of the housing; and a casing coupled to the driver, the casing being configured to lift and lower the rotating portion in response to rotation of the rotating portion.

17. The laundry treating apparatus of claim 16, wherein the casing includes:

an accommodating body configured to mount the rotating portion therein; and an ascending/descending rib located on one surface of the accommodating body to support the rotating portion, and wherein the rotating portion includes:

a rotatable moving body configured to support the support body; and an ascending/descending inducing portion along a circumference of the moving body, the ascending/descending inducing portion being supported by the ascending/descending rib to lift and lower the moving body.

18. The laundry treating apparatus of claim 17, wherein the ascending/descending inducing portion includes:

a lower support located on a first surface of the moving body; and an upper support located above the lower support and on the first surface of the moving body.

19. The laundry treating apparatus of claim 18, wherein the ascending/descending inducing portion includes:

an ascending support extending from a first end of the lower support to a first end of the upper support; and a descending support extending from a second end of the upper support to a second end of the lower support.

20. A laundry treating apparatus comprising:

a tub configured to store water therein;

a drum rotatably located in the tub to receive laundry therein;

a pulsator rotatably located in the drum to agitate the laundry;

a driver coupled to the tub, the driver being configured to provide power to rotate at least one of the drum and the pulsator; and a clutch located between the driver and the pulsator to transmit the power to the at least one of the drum and the pulsator, the clutch including:

a gear assembly rotatably engaged with the driver;

a rotation shaft coupled to the gear assembly to rotate the pulsator;

a housing coupled to the drum to rotate the drum, the housing being configured to receive the gear assembly and the rotation shaft therein;

a coupler located inside the housing, the coupler being configured to ascend and descend to selectively connect and disconnect the driver and the housing to each other; and a support located outside the housing to lift and lower the coupler by supporting the coupler, the support being configured to lift and lower the coupler while the support ascends and descends with the coupler.

21. The laundry treating apparatus of claim 20, wherein the coupler and the support are located above a lower end of the housing and facing the driver.

22. The laundry treating apparatus of claim 20, wherein the coupler and the support ascend and descend between the gear assembly and a lower end of the housing.

23. The laundry treating apparatus of claim 20, wherein the support is configured to support the coupler through the housing, and wherein the housing includes a through-hole configured to allow the support to ascend and descend.

24. A laundry treating apparatus comprising:

a tub configured to store water therein;

a drum rotatably located in the tub to receive laundry therein;

a pulsator rotatably located in the drum to agitate the laundry;

a driver coupled to the tub, the driver being configured to provide power to rotate at least one of the drum and the pulsator; and a clutch located between the driver and the pulsator to transmit the power to the at least one of the drum and the pulsator, the clutch including:

a gear assembly rotatably engaged with the driver;

a rotation shaft coupled to the gear assembly to rotate the pulsator;

a housing coupled to the drum to rotate the drum, the housing being configured to receive the gear assembly and the rotation shaft therein;

a coupler located inside the housing, the coupler being configured to ascend and descend along a longitudinal direction of the rotation shaft to selectively connect the driver and the housing to each other; and a support penetrating through the housing to lift and lower the coupler.

25. The laundry treating apparatus of claim 24, further comprising:

a mover located outside of the housing, the mover being configured to lift and lower the support; and an actuator configured to lift and lower the mover, the mover and the actuator at least partially overlapping the driver in the longitudinal direction of the rotation shaft.

\* \* \* \* \*